United States Patent
Terashima et al.

(10) Patent No.: US 11,933,468 B2
(45) Date of Patent: Mar. 19, 2024

(54) HEADLIGHT DEVICE HAVING OPTICAL BEAM SPLITTER

(71) Applicant: Mitsubishi Electric Corporation, Tokyo (JP)

(72) Inventors: Haruka Terashima, Tokyo (JP); Masashige Suwa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/017,863

(22) PCT Filed: Sep. 16, 2020

(86) PCT No.: PCT/JP2020/035059
§ 371 (c)(1),
(2) Date: Jan. 25, 2023

(87) PCT Pub. No.: WO2022/059089
PCT Pub. Date: Mar. 24, 2022

(65) Prior Publication Data
US 2023/0280010 A1  Sep. 7, 2023

(51) Int. Cl.
*F21S 41/32* (2018.01)
*F21S 41/143* (2018.01)
(Continued)

(52) U.S. Cl.
CPC ............ *F21S 41/32* (2018.01); *F21S 41/143* (2018.01); *F21S 41/148* (2018.01); *F21S 41/25* (2018.01)

(58) Field of Classification Search
CPC .......... F21S 41/30; F21S 41/32; F21S 41/141; F21V 11/10; F21V 7/00; B60Q 1/0017; B60Q 1/02; B60Q 1/04; B60Q 1/0023
See application file for complete search history.

(56) References Cited

U.S. PATENT DOCUMENTS

| 2009/0015388 A1 | 1/2009 | Yagi et al. |
| 2014/0204398 A1 | 7/2014 | Sato et al. |

(Continued)

FOREIGN PATENT DOCUMENTS

| JP | 55-92110 U | 6/1980 |
| JP | 5-338487 A | 12/1993 |

(Continued)

OTHER PUBLICATIONS

International Search Report and Written Opinion dated Nov. 24, 2020, received for PCT Application PCT/JP2020/035059, filed on Sep. 16, 2020, 13 pages including English Translation.

(Continued)

*Primary Examiner* — Ismael Negron
(74) *Attorney, Agent, or Firm* — XSENSUS LLP

(57) ABSTRACT

A headlight device includes a first optical system and a second optical system. The first optical system emits first light in a predetermined emission direction. Part of an optical axis of the first optical system coincides with part of an optical axis of the second optical system in the emission direction. The second optical system includes a light receiver and a first optical part, and second light traveling in an incidence direction opposite to the emission direction is incident on the second optical system. The first optical part includes an aperture part that sets a diameter of the second light traveling toward the light receiver through the second optical system to be smaller than a diameter of the second light when entering the second optical system.

13 Claims, 16 Drawing Sheets

(51) Int. Cl.
    *F21S 41/148*      (2018.01)
    *F21S 41/25*       (2018.01)

(56)            References Cited

U.S. PATENT DOCUMENTS

2017/0102454 A1    4/2017   Yuasa
2018/0264990 A1    9/2018   Mouri et al.
2018/0284282 A1   10/2018   Hong et al.

FOREIGN PATENT DOCUMENTS

JP         10-90607 A      4/1998
JP       2001-349704 A    12/2001
JP        2009-18726 A     1/2009
JP       2010-260379 A    11/2010
JP        2013-39868 A     2/2013
JP       2013-191478 A     9/2013
JP         2017-72466 A    4/2017
JP       2018-156862 A    10/2018
JP         2019-64371 A    4/2019
JP       2020-508457 A     3/2020
WO      2021/095156 A1     5/2021

OTHER PUBLICATIONS

U.S. Appl. No. 17/766,742, filed Apr. 6, 2022, Masashige Suwa et al.

HEADLIGHT DEVICE HAVING OPTICAL BEAM SPLITTER

CROSS-REFERENCE TO RELATED APPLICATIONS

The present application is based on PCT filing PCT/JP2020/035059, filed Sep. 16, 2020. This application is also related to U.S. patent application Ser. No. 17/766,742, entitled HEADLIGHT DEVICE, filed Apr. 6, 2022. The entire contents of each are incorporated herein by reference.

TECHNICAL FIELD

The present disclosure relates to a headlight device.

BACKGROUND ART

There has been proposed a headlight device with high functionality that includes a projection optical system that emits illuminating light and an imaging optical system including a light receiver upon which incident light for detecting a target object such as another vehicle situated in an emission direction of the illuminating light is incident. The headlight device controls a light distribution pattern of the illuminating light based on the result of the detection by the light receiver. See, for example, Patent Reference 1. In the headlight device of the Patent Reference 1, a part of the projection optical system shares a part of the imaging optical system.

PRIOR ART REFERENCE

Patent Reference

Patent Reference 1: Japanese Patent Application Publication No. 2019-64371

SUMMARY OF THE INVENTION

Problem to be Solved by the Invention

However, in the headlight device of the Patent Reference 1, rays incident on the light receiver include peripheral rays included in the incident light and traveling at positions far from an optical axis. Thus, there is a problem in that aberration occurs in the image formed on the light receiver and incident light detection accuracy in the light receiver decreases.

An object of the present disclosure is to provide a headlight device having increased incident light detection accuracy in the light receiver.

Means for Solving the Problem

A headlight device according to an aspect of the present disclosure includes a first optical system that emits first light in a predetermined emission direction and a second optical system including a light receiver and a first optical part and on which second light traveling in an incidence direction opposite to the emission direction is incident. Part of an optical axis of the first optical system coincides with part of an optical axis of the second optical system in the emission direction. The first optical part includes an aperture part that sets a diameter of the second light traveling toward the light receiver through the second optical system to be smaller than a diameter of the second light when entering the second optical system.

Effect of the Invention

According to the present disclosure, a headlight device having increased incident light detection accuracy in the light receiver can be provided.

MODE FOR CARRYING OUT THE INVENTION

Figure 1:
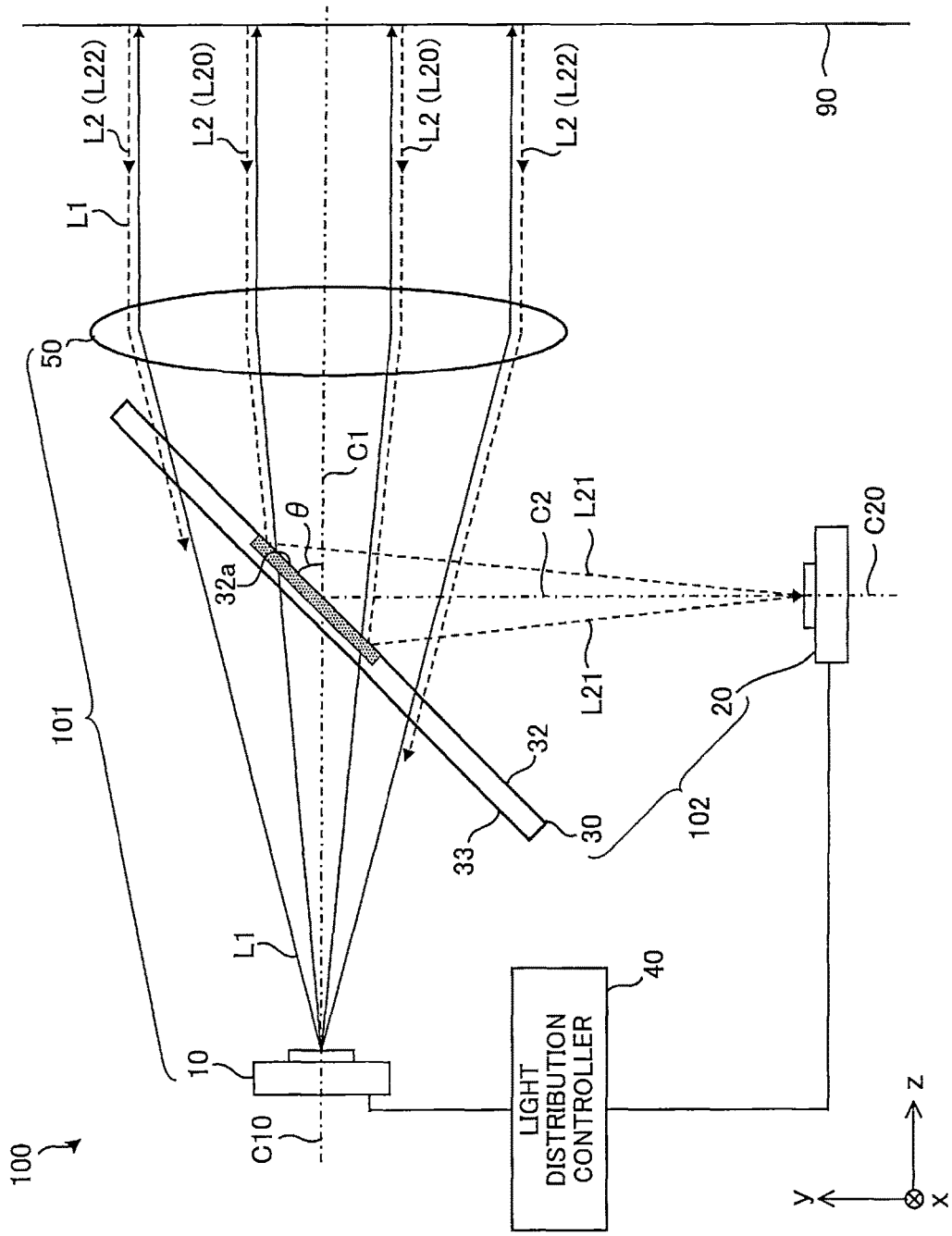
FIG. 1 is a side view schematically showing a main configuration of a headlight device according to a first embodiment.

Headlight devices according to embodiments will be described below with reference to the drawings. The following embodiments are just examples and it is possible to appropriately combine embodiments and appropriately modify each embodiment.

The headlight device according to each embodiment is a headlight device for a vehicle, for example. The vehicle is a four-wheel automobile, a motor tricycle, a motorcycle or the like, for example.

The following description will be given of an example in which an irradiation state of the light emitted from the headlight device according to each embodiment is a high beam. High beam represents a light irradiation state for the traveling of the vehicle. The light emitted by the high beam has a light distribution pattern with a wider range and higher illuminance as compared to light emitted by a low beam which represents a light irradiation state for passing by. Therefore, when light is emitted from the headlight device by the high beam, the visual field of the driver of the vehicle equipped with the headlight device is secured excellently. However, when the light is emitted by the high beam, there is a possibility of dazzling drivers of a leading vehicle and an oncoming vehicle. To prevent the dazzlement, the headlight device according to each embodiment executes control for adjusting the light distribution pattern of the light, such as ADB (Adaptive Driving Beam) control. In the headlight device according to each embodiment, the light distribution pattern of the light emitted by the high beam is adjusted so that an irradiation region of the light matches a targeted region (for example, a region excluding the leading vehicle and the oncoming vehicle).

Coordinate axes of an xyz orthogonal coordinate system are shown in the drawings to facilitate the understanding of the description. The axes shown in the drawings will be explained below. An x-axis is a coordinate axis parallel to a transverse direction of the vehicle. Namely, an x-axis direction is a width direction of the vehicle. When facing a forward direction of the vehicle, a leftward direction is a +x-direction. A y-axis is a coordinate axis parallel to an upward/downward direction of the vehicle. An upward direction of the vehicle is a +y-axis direction, and a downward direction of the vehicle is a −y-axis direction. Namely, a +y-axis side of the vehicle is the sky side, and a −y-axis side of the vehicle is the road surface side. A z-axis is a coordinate axis orthogonal to the x-axis and the y-axis. A z-axis direction is a traveling direction of the vehicle. In the following description, a "+z-axis direction" is referred to also as the "forward direction".

First Embodiment (Configuration of Headlight Device)

Figure 2:
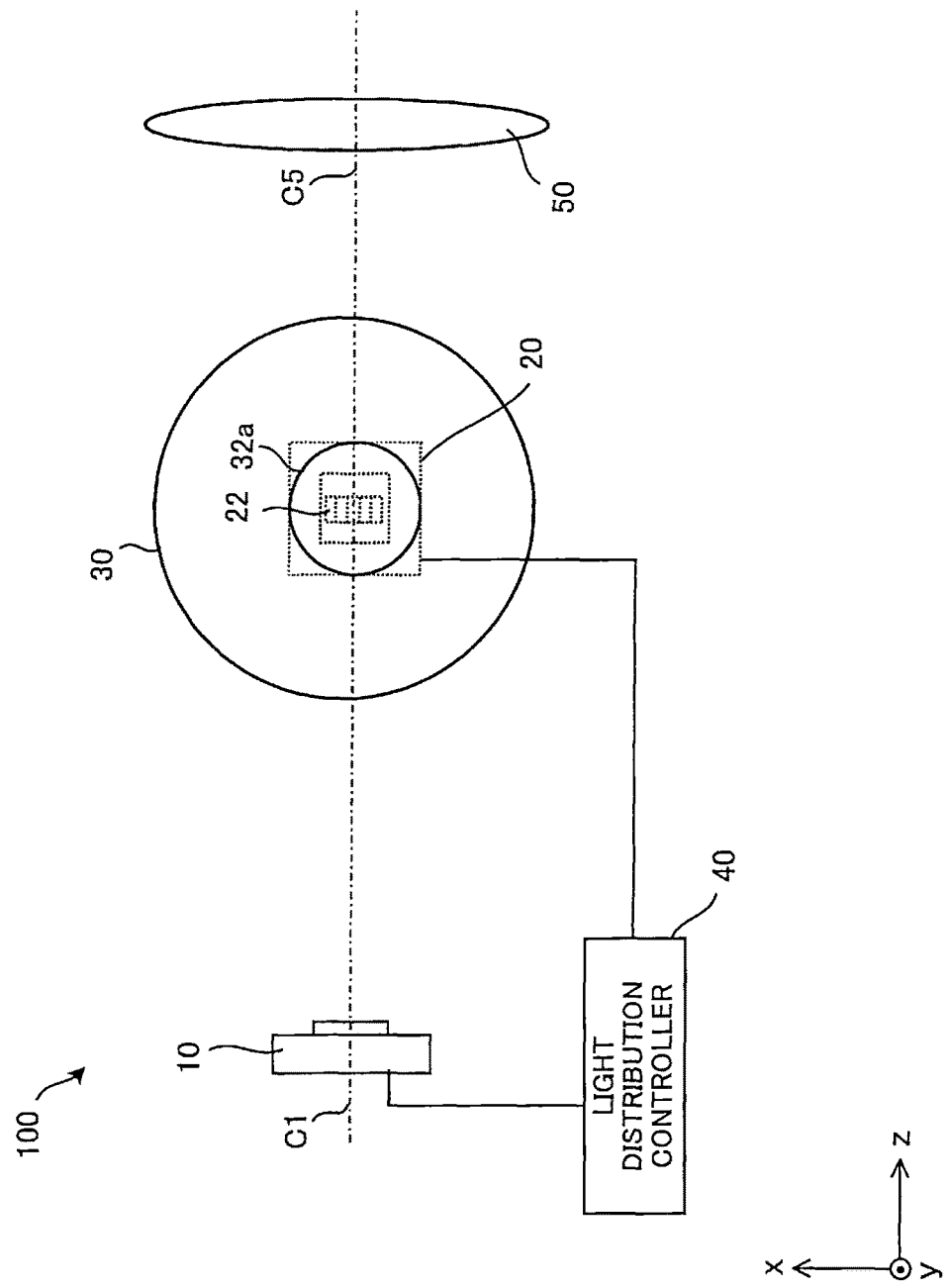
FIG. 2 is a plan view schematically showing the main configuration of the headlight device according to the first embodiment.
Figure 3:
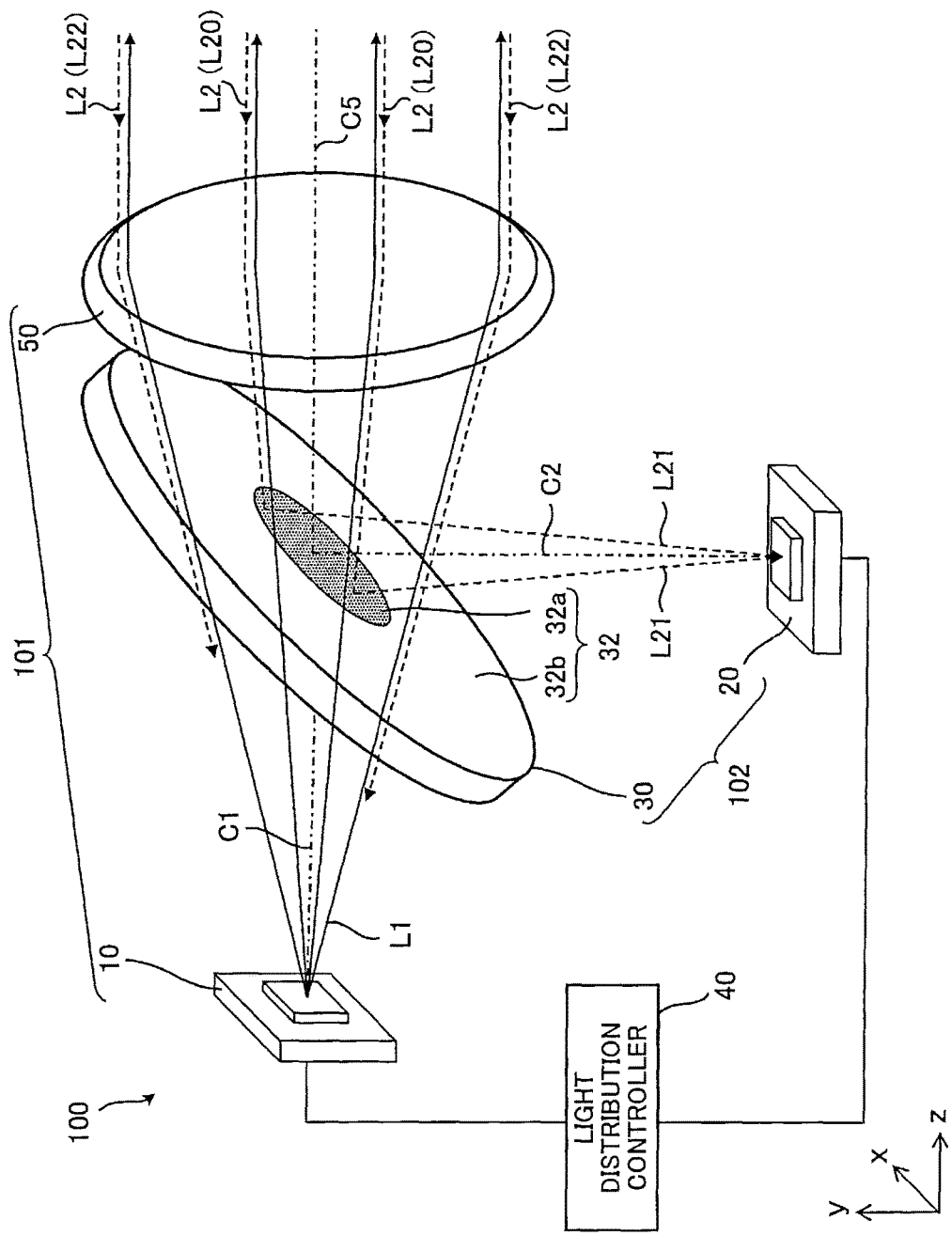
FIG. 3 is a perspective view schematically showing the main configuration of the headlight device according to the first embodiment.

FIG. 1 is a side view schematically showing a main configuration of a headlight device 100 according to a first embodiment. FIG. 2 is a plan view schematically showing the main configuration of the headlight device 100 according to the first embodiment. FIG. 3 is a perspective view schematically showing the main configuration of the headlight device 100 according to the first embodiment. In the first embodiment, a description will be given of an example in which the headlight device 100 according to the headlight module. Therefore, the headlight device 100 is referred to also as a "headlight module" in the following description. Incidentally, the headlight device 100 may also include a plurality of headlight modules.

As shown in FIGS. 1 to 3, the headlight device 100 includes a light source part 10, a light receiver 20, and a beam splitter 30 as a first optical part. Incidentally, the configuration of the headlight device 100 is not limited to the configuration shown in FIGS. 1 to 3 but may also be a configuration shown in any one of FIGS. 6 to 11 which will be explained later.

The light source part 10 is one of members forming a projection optical system 101 of the headlight device 100. The projection optical system 101 has an optical axis C1 as a first optical axis and emits light L1 as first light in a predetermined emission direction. In the first embodiment, the emission direction is the +z-axis direction which is a direction along the optical axis C1. Incidentally, the configuration of the light source part 10 will be described later.

The light receiver 20 and the beam splitter 30 are members forming an imaging optical system 102. The light receiver 20 is a light detector that detects incident light L2 as second light traveling in an incidence direction (−z-axis direction in the first embodiment) opposite to the emission direction. In FIGS. 1 to 3, an optical axis of the light receiver 20 is indicated as an optical axis C20. Incidentally, the configuration of the light receiver 20 will be described later.

The beam splitter 30 emits the light L1 in the emission direction and guides the incident light L2 to the light receiver 20. In the first embodiment, the beam splitter 30 reflects a central light flux L20, which is part of the incident light L2, and emits the reflected light as light L21 heading for the light receiver 20. Here, the central light flux 120 is a light flux included in the incident light L2 and including a central ray of the incident light L2. Incidentally, the central light flux 120 may be referred to also as a bundle of rays included in the incident light L2 and traveling on the optical axis C1 or in a region in the vicinity of the optical axis C1 (hereinafter referred to also as a "paraxial region"). The central light flux 120 can include rays traveling in parallel with the optical axis C1 and rays traveling not in parallel with the optical axis C1 in the paraxial region of the optical axis C1.

The beam splitter 30 includes a central part 32a as an aperture part. The central part 32a is arranged on the optical axis C1 and sets the diameter of the light L21 traveling toward the light receiver 20 through the imaging optical system 102 to be smaller than the diameter of the incident light L2 when entering the imaging optical system 102. The central part 32a is formed at a position on the beam splitter 30 to cover the region at which the central light flux L20 arrives, for example. Incidentally, different configurations of the beam splitter 30 will be described later.

(Light Source Part)

Figure 4:
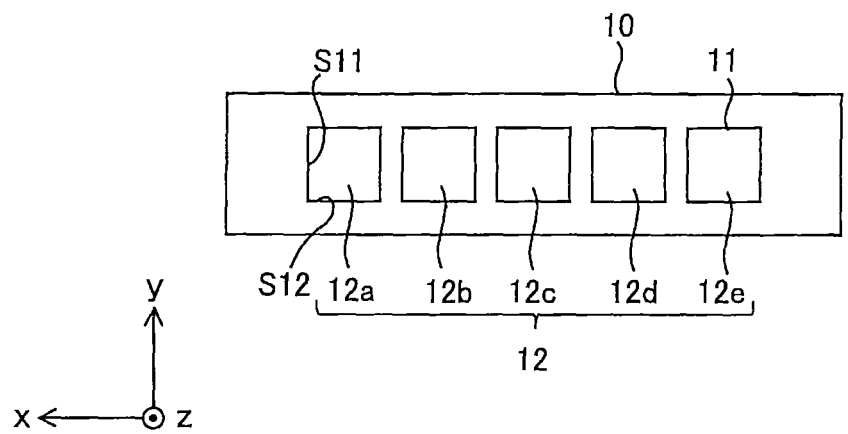
FIG. 4 is a diagram showing a configuration of a light source part shown in FIGS. 1 to 3.

FIG. 4 is a diagram showing the configuration of the light source part 10 shown in FIGS. 1 to 3. FIG. 4 is a diagram of the light source part 10 shown in FIGS. 1 to 3 as viewed from a position on the +z-axis side. As shown in FIG. 4, the light source part 10 may include a plurality of light-emitting elements 11, for example. The light-emitting element 11 is a solid-state light source. The solid-state light source is a light source having directivity, such as a semiconductor light source like a light-emitting diode (LED), for example. As another example of the solid-state light source, the light-emitting element 11 may also be an organic electroluminescence light source or a light source that irradiates fluorescent material with excitation light and thereby causes the fluorescent material to emit light. The light-emitting element 11 is desired to be an LED, since the LED is small in size, is easily used in an array, provides high luminance, has small influence on living bodies, and is low in cost.

In the following description, a surface of the light-emitting element 11 facing the +z-axis direction is referred to as a light-emitting surface 12. The light source part 10 includes one of a plurality of light-emitting surfaces 12. When the light source part 10 includes a plurality of light-emitting surfaces 12, the light source part 10 includes N light-emitting surfaces 12 arranged in a predetermined arrangement direction, for example. N is a positive integer, which is 5 in the example shown in FIG. 4. In the example shown in FIG. 4, the arrangement direction of the plurality of light-emitting surfaces L2 is the x-axis direction. In the example shown in FIG. 4, the plurality of light-emitting surfaces 12 are linearly arranged in a row. Incidentally, in the following description, the plurality of light-emitting surfaces 12 arranged in the x-axis direction are represented also as 12a, 12b, 12c, 12d and 12e. Further, the number of light-emitting surfaces 12 provided on the light source part 10 may also be one as mentioned above. Furthermore, the light source part 10 may include a configuration for light distribution adjustment such as a movable light blocking plate (not shown).

The shape of the light-emitting surface 12 as viewed in the z-axis direction is a rectangular shape, for example. In FIG. 4, the length of a side S12 of the light-emitting surface 12 extending in the x-axis direction is the same as the length of a side S11 of the light-emitting surface 12 extending in the y-axis direction. Namely, in FIG. 4, the shape of the light-emitting surface 12 is a square shape. Incidentally, the shape of the light-emitting surface 12 is not limited to the square shape but may also be a different rectangular shape such as a non-square rectangular shape or a different shape such as a circular shape.

(Projection/Imaging Dual-Purpose Lens)

Figure 6:
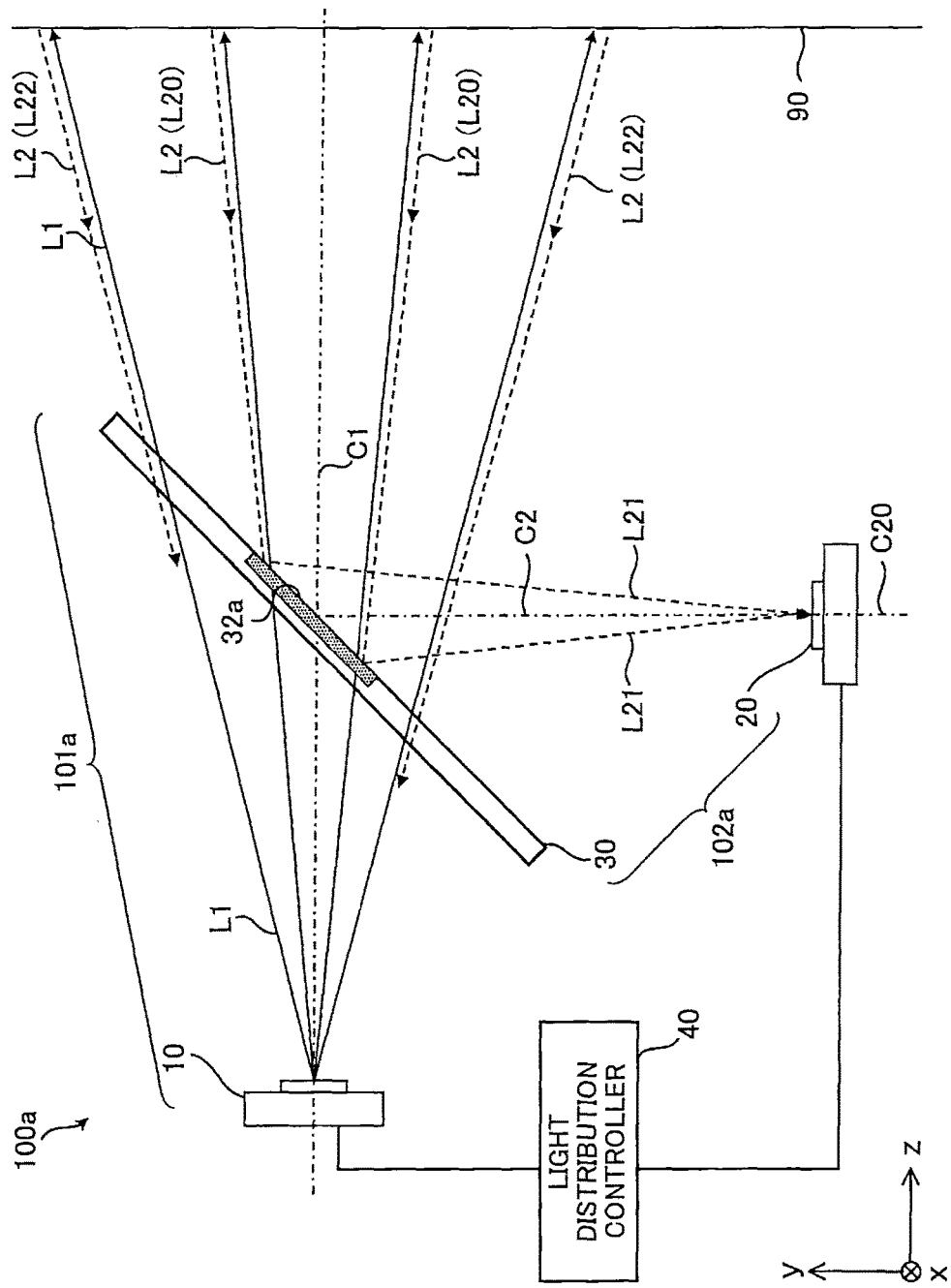
FIG. 6 is a side view schematically showing a main configuration of a headlight device according to a first modification of the first embodiment.

The headlight device 100 may include a lens as a second optical part. Namely, the headlight device 100 may include at least one lens. As shown in FIGS. 1 to 3, the headlight device 100 may include a projection/imaging dual-purpose lens 50, for example. The projection/imaging dual-purpose lens 50 is arranged on a optical path of the light L1 traveling in the emission direction and is arranged on an optical path of the incident light L2 traveling in the incidence direction. Incidentally, the headlight device 100 can be implemented even without the projection/imaging dual-purpose lens 50 as shown in FIG. 6 which will be explained later.

The projection/imaging dual-purpose lens 50 has a function of projecting the light L1 emitted from the light source part 10 and a function of causing the incident light L2 as detection light incident from the outside to form an image on the light receiver 20. The projection/imaging dual-purpose lens 50 is a lens having positive power, for example. The projection/imaging dual-purpose lens 50 can be either a spherical lens or an aspherical lens. In the first embodiment, the projection/imaging dual-purpose lens 50 is formed of one lens. The projection/imaging dual-purpose lens 50 may also be formed of a lens set including a plurality of lenses. In the case where the projection/imaging dual-purpose lens 50 is formed of a lens set, light utilization efficiency decreases with the increase in the number of lenses, and thus the projection/imaging dual-purpose lens 50 is desired to be formed of two lenses. Thus, the projection/imaging dual-purpose lens 50 is desired to be formed of one or two lenses. The projection/imaging dual-purpose lens 50 is formed of transparent resin or the like, for example. Incidentally, in the first embodiment, the second optical part that projects the light L1 emitted from the light source part 10 in the forward direction may also be formed by a combination of the projection/imaging dual-purpose lens 50 and a reflecting mirror.

The light L1 entering the projection/imaging dual-purpose lens 50 passes through the projection/imaging dual-purpose lens 50 and is emitted toward a predetermined irradiation region in the forward direction. Here, the "predetermined irradiation region" is a predetermined region on an irradiation surface 90 arranged at a position on the +z-axis side relative to the projection/imaging dual-purpose lens 50. Here, the irradiation surface 90 is a virtual projection surface onto which the light distribution pattern of the light L1 is projected.

In FIGS. 1 to 3, an optical axis of the projection/imaging dual-purpose lens 50 is indicated as an optical axis C5, and an optical axis of the light source part 10 is indicated as an optical axis C10. The optical axis C10 of the light source part 10 and the optical axis C5 of the projection/imaging dual-purpose lens 50 are situated on the same straight line. Namely, the optical axis C10 and the optical axis C5 coincide with each other.

(Beam Splitter)

Next, the configuration of the beam splitter 30 will be described below. The beam splitter 30 is an optical member that splits the optical path of the incident light L2 incident from the outside by reflecting part of the incident light L2 with a light reflecting surface 32 having predetermined reflectance. The beam splitter 30 may be formed of a dichroic mirror, for example. The beam beam splitter 30 transmits the incident light L1 and emits the light in the +z-axis direction. In the first embodiment, the light source part 10 is arranged at a position on the −z-axis side relative to the beam splitter 30. Thus, the beam splitter 30 emits the light L1 entering from the −z-axis side in the emission direction (namely, the +z-axis direction) as the illuminating light.

Further, the light receiver 20 is arranged at a position on the −y-axis side relative to the beam splitter 30. The light receiver 20 may also be arranged at a position on the +y-axis side relative to the beam splitter 30. The beam splitter 30 guides the incident light L2, which is incident thereon via the projection/imaging dual-purpose lens 50, to the light receiver 20. Specifically, the beam splitter 30 emits the incident light L2 traveling in the incidence direction (i.e., the −z-axis direction) as the light L21 traveling toward the light receiver 20.

Figure 17:
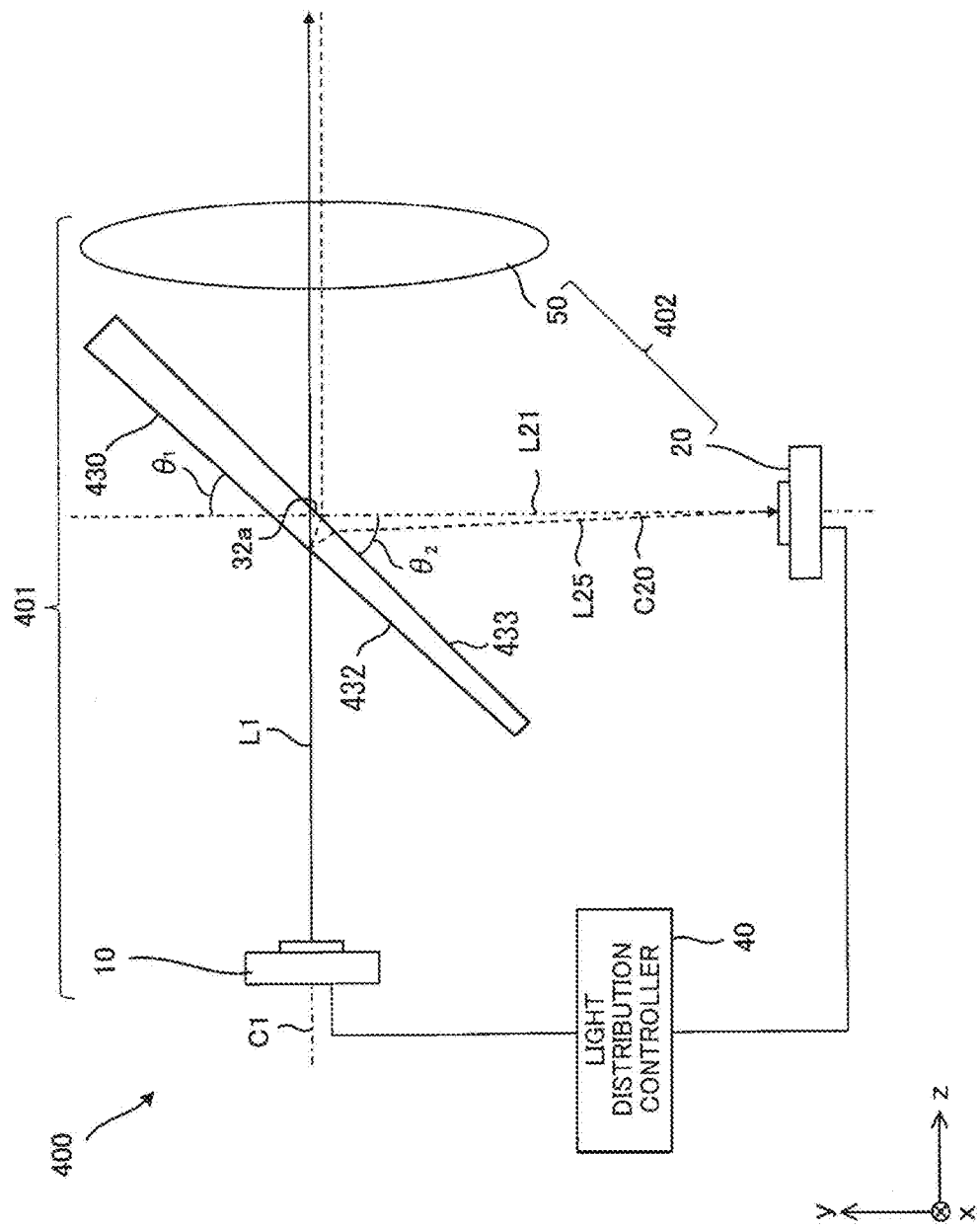
FIG. 17 is a side view schematically showing a main configuration of a headlight device according to a fourth embodiment.

The beam splitter 30 has a light-transmission surface 33 that transmits the light L1. In this way, the beam splitter 30 may have the property of transmitting the light L1, that is, optical transparency. Further, the beam splitter 30 has the light reflecting surface 32 that reflects the incident light L2. In the example shown in FIG. 1, the angle θ of the light reflecting surface 32 with respect to the optical axis C1 is 45 degrees. The angle θ is not limited to 45 degrees but may be set at a different value. The incident light L2 reflected by the light reflecting surface 32 travels in the −y-axis direction as the light L21 heading for the light receiver 20. In the first embodiment, the light reflecting surface 32 and the light-transmission surface 33 are parallel to each other. Incidentally, the light reflecting surface 32 and the light-transmission surface 33 may also be non-parallel to each other as shown in FIG. 17 which will be explained later.

As shown in FIG. 3, the light reflecting surface 32 of the beam splitter 30 includes the central part 32a as the aperture part. The central part 32a is arranged on the optical axis C1. The central part 32a reflects the central light flux L20 as part of the incident light L2 and guides the central light flux L20 to the light receiver 20. Accordingly, the bundle of rays of the light L21 incident on the light receiver 20 is formed by rays traveling in the paraxial region of the optical axis C1. Namely, the central part 32a sets the diameter of the light L21 traveling toward the light receiver 20 through the beam splitter 30 to be smaller than the diameter of the incident light L2 when entering the projection/imaging dual-purpose lens 50. Therefore, peripheral rays L22 (see FIG. 1), which are rays included in the incident light L2 and traveling at positions far from the optical axis C1, are unlikely to be incident on the light receiver 20, and thus aberration of the image formed on the light receiver 20 is reduced. Accordingly, the detection accuracy of the incident light L2 in the light receiver 20 can be increased.

The light reflecting surface 32 of the beam splitter 30 further includes a peripheral part 32b arranged on an outer side relative to the central part 32a. The peripheral part 32b transmits the light L1 and reflects the incident light L2. The reflectance of the peripheral part 32b is lower than the reflectance of the central part 32a. With this feature, the peripheral rays L22 (see FIG. 1) included in the incident light L2 can be inhibited from being incident on the light receiver 20. In other words, in the incident light L2, the light L21 reflected by the central part 32a is likely to be incident on the light receiver 20. Accordingly, the aberration of the image formed on the light receiver 20 is reduced, and thus the detection accuracy of the incident light L2 in the light receiver 20 can be increased.

The central part 32a may be applied with a metal deposition coating or a dielectric beam splitter coating, for example. The peripheral part 32b may be applied with an AR (Anti-Reflective) coating, for example. Incidentally, the peripheral part 32b may also be applied with no AR coating. The shape of the central part 32a is a circular shape, for example. The shape of the central part 32a is not limited to the circular shape but may also be a different shape. Further, a plurality of reflective regions differing from each other in reflectance may be formed continuously on the light reflecting surface 32 so that the reflectance increases smoothly as the position moves from an outer edge of the beam splitter 30 toward the optical axis C1. Furthermore, a plurality of reflective regions may be formed discretely on the light reflecting surface 32 so that the reflectance increases stepwise as the position moves from the outer edge of the beam splitter 30 toward the optical axis C1. From the viewpoint of efficiently guiding the incident light L2 traveling in the vicinity of the optical axis C1 to the light receiver 20, it is desirable to employ the configuration in which a plurality of reflective regions differing from each other in the reflectance are formed continuously on the light reflecting surface 32 so that the reflectance increases smoothly as the position moves toward the optical axis C1.

(Light Receiver)

Next, the configuration of the light receiver 20 will be described below. The light receiver 20 is arranged between the light source part 10 and the projection/imaging dual-purpose lens 50 in the z-axis direction. The light receiver 20 detects the incident light 12 emitted from a predetermined light receiving region situated in the forward direction and incident thereon via the projection/imaging dual-purpose lens 50 and the beam splitter 30. The incident light L2 is the detection light detected by the light receiver 20. Here, the "predetermined light receiving region" is a predetermined region existing at a position on the +z-axis side relative to the projection/imaging dual-purpose lens 50 and including at least the aforementioned "predetermined irradiation region". For example, when an object emitting light exists in the region irradiated with light L1 situated on the +z-axis side relative to the projection/imaging dual-purpose lens 50, the incident light L2 may be light emitted from the object. As an example, when an oncoming vehicle is included in the predetermined light receiving region in the forward direction, the incident light L2 may be light emitted from a headlight of the oncoming vehicle. When a leading vehicle is included in the predetermined light receiving region in the forward direction, the incident light L2 may be light emitted from a taillight of the leading vehicle. When an object reflecting light exists in the region irradiated with light L1 situated OD the +z-axis side relative to the projection/imaging dual-purpose lens 50, the incident light L2 may be light reflected by the object. As an example, when a pedestrian wearing a reflective material, a road surface or a guardrail coated with a reflective material, or the like exists in the predetermined light receiving region in the forward direction, the incident light L2 may be light reflected by the pedestrian, the road surface or the guardrail. As above, the object as a light-emitting point of the incident light L2 can be any object (a road surface, an oncoming vehicle, a leading vehicle, a pedestrian or the like) situated on the +z-axis side relative to the projection/imaging dual-purpose lens 50.

Figure 5:
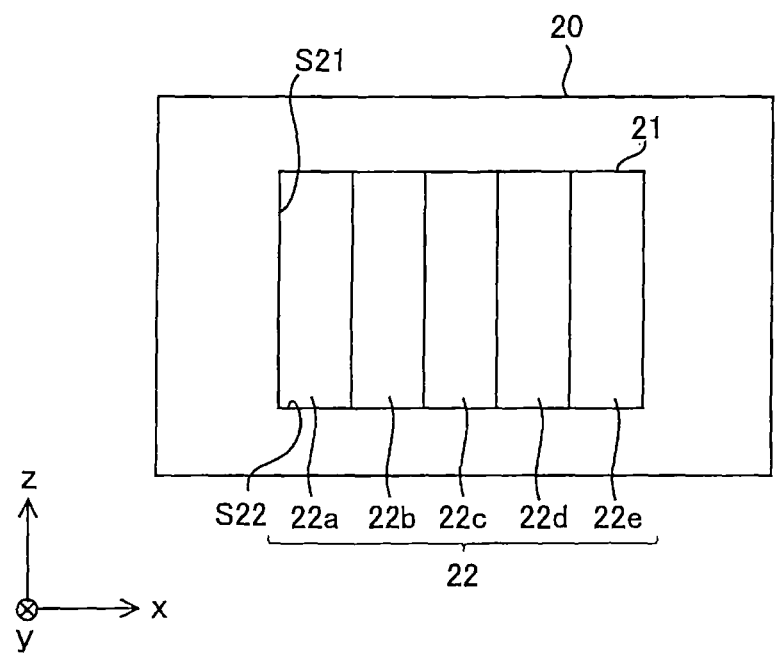
FIG. 5 is a diagram showing a configuration of a light receiver shown in FIGS. 1 to 3.

FIG. 5 is a diagram showing the configuration of the light receiver 20 shown in FIGS. 1 to 3. FIG. 5 is a diagram of the light receiver 20 shown in FIGS. 1 to 3 as viewed from a position on the +y-axis side. As shown in FIG. 5, the light receiver 20 includes a plurality of light receiving elements 21. The light receiving element 21 is, for example, a semiconductor element that transduces energy of the received light L21 to an electric signal. The light receiving element 21 is a photodiode, a CCD (Charge Coupled Device) image sensor, a CMOS (Complementary Metal Oxide Semiconductor) image sensor or the like, for example. The light receiver 20 may be a line sensor including a plurality of light receiving elements 21. In the following description, a surface of the light receiving element 21 facing the +y-axis direction is referred to as a light receiving surface 22.

The light receiver 20 includes a plurality of light receiving surfaces 22 arranged in the x-axis direction. In the following description, the plurality of light receiving surfaces 22 arranged in the x-axis direction are represented also as light receiving surfaces 22a, 22b, 22c, 22d and 22e. The light receiver 20 includes M light receiving surfaces 22 arranged in a direction corresponding to the arrangement direction of the plurality of light-emitting surfaces 12 (see FIG. 4). M is a positive integer, which is 5 in the example shown in FIG. 5. Here, the "direction corresponding to the arrangement direction of the plurality of light-emitting surfaces 12" means either a direction parallel to the arrangement direction of the plurality of light-emitting surfaces 12 or a direction not parallel to but inclined with respect to the arrangement direction of the plurality of light-emitting surfaces 12. In the example shown in FIG. 5, the plurality of light receiving surfaces 22 are arranged in the x-axis direction parallel to the arrangement direction of the plurality of light-emitting surfaces 12. Further, in the first embodiment, the number M of the plurality of light receiving surfaces 22 is equal to the number N of the plurality of light-emitting surfaces 12 shown in FIG. 4. Thus, in the first embodiment, the plurality of light receiving surfaces 22 and the plurality of light-emitting surfaces 12 are in a one-to-one correspondence.

Further, as shown in FIG. 5, the plurality of light receiving surfaces 22 may be linearly arranged in a row, for example. The shape of the light receiving surface 22 as viewed in the y-axis direction is a rectangular shape, for example. In the example shown in FIG. 5, the length of a side S21 of the light receiving surface 22 extending in the z-axis direction is longer than the length of a side S22 of the light receiving surface 22 extending in the x-axis direction. Namely, in FIG. 5, the shape of the light receiving surface 22 is a non-square rectangular shape. With this configuration, a margin can be secured in the upward/downward direction of the light receiving surface 22 (i.e., the z-axis direction) and a mobile object (for example, another vehicle, a pedestrian or the like) situated in the forward direction can be detected accurately. Incidentally, the shape of the light receiving surface 22 is not limited to the non-square rectangular shape but may also be a different rectangular shape such as a square shape. Further, the shape of the light receiving surface 22 is not limited to the rectangular shape but may also be a different shape such as a circular shape.

(Light Distribution Controller)

The headlight device 100 further includes a light distribution controller 40 connected to the light source part 10 and the light receiver 20. The light distribution controller 40 makes the light source part 10 adjust the light distribution pattern of the light L1 based on a detection signal corresponding to the light L21 detected by the light receiver 20.

For example, the light distribution controller 40 judges whether or not the intensity of the light L21 detected by each of the plurality of light receiving surfaces 22 (see FIG. 5) is greater than or equal to a predetermined threshold value. Then, if the intensity of the light L21 detected by at least one (for example, the light receiving surface 22c shown in FIG. 5) of the plurality of light receiving surfaces 22 is judged to be greater than or equal to the threshold value, the light distribution controller 40 controls the light-emitting surfaces 12 (see FIG. 4) of the light source part 10. Specifically, the light distribution controller 40 executes control to stop light emission at the light-emitting surface 12c corresponding to the light receiving surface 22c at which the light L21 with intensity greater than or equal to the threshold value is detected and start light emission at the other light-emitting surfaces 12a, 12b, 12d and 12e among the plurality of light-emitting surfaces 12. With this method, it is possible to make the light source part 10 adjust the light distribution pattern of the light L1. In the first embodiment, the detection accuracy of the light L21 in the light receiver 20 has been increased. Therefore, the light distribution pattern of the light L1 is correctly applied to the targeted irradiation region and the visual field of the driver of the vehicle equipped with the headlight device 100 can be scoured excellently.

The light distribution controller 40 is a control circuit made of semiconductor integrated circuits, for example. The light distribution controller 40 may also be formed by a processor that executes a program stored in a memory.

(Projection Optical System and Imaging Optical System)

Next, optical systems implemented by combinations of the light source part 10, the light receiver 20, the beam splitter 30 and the projection/imaging dual-purpose lens 50, which are components of the headlight module, will be described below. In the first embodiment, the light source part 10, the beam splitter 30 and the projection/imaging dual-purpose lens 50 form the projection optical system 101 as a first optical system that emits the light L1 as the illuminating light in the forward direction of the vehicle equipped with the headlight module. The light L1 emitted from the light source part 10 passes through the beam splitter 30 and is emitted by the projection/imaging dual-purpose lens 50 in the forward direction of the vehicle.

Further, the projection/imaging dual-purpose lens 50, the beam splitter 30 and the light receiver 20 form the imaging optical system 102 as a second optical system that captures images of the scene in front of the vehicle. The incident light L2 incident from the outside via the projection/imaging dual-purpose lens 50 is reflected by the beam splitter 30 and is focused on the light receiving surface 22 of the light receiver 20 to form an image. The imaging optical system 102 has an optical axis C2 as a second optical axis. In the first embodiment, the projection optical system 101 and the imaging optical system 102 share the beam splitter 30 and the projection/imaging dual-purpose lens 50. Namely, the projection optical system 101 and the imaging optical system 102 have the common optical axis C5 in front of the beam splitter 30. Thus, part of the optical axis C1 of the projection optical system 101 coincides with part of the optical axis C2 of the imaging optical system 102 in the emission direction.

(Effect of First Embodiment)

According to the first embodiment described above, in the headlight device 100, part of the optical axis C1 of the projection optical system 101 coincides with part of the optical axis C2 of the imaging optical system 102 in the emission direction (specifically, in front of the beam splitter 30). Therefore, a process of adjusting the optical axis C1 of the projection optical system 101 and the optical axis C2 of the imaging optical system 102 is unnecessary in the headlight device 100. Accordingly, it becomes easy to make an irradiation range of the light L1 emitted from the headlight device 100 and an incidence range of the incident light L2 incident on the headlight device 100 coincide with each other.

Further, according to the first embodiment, the imaging optical system 102 of the headlight device 100 includes the beam splitter 30. The beam splitter 30 includes the central part 32a as the aperture part, and the central part 32a sets the diameter of the light L21 traveling toward the light receiver 20 through the imaging optical system 102 (namely, the beam splitter 30) to be smaller than the diameter of the incident light L2 when entering the imaging optical system 102 (namely, the projection/imaging dual-purpose lens 50). Therefore, the peripheral rays L22 included in the incident light L2 and traveling at positions far from the optical axis C1 become unlikely to be incident on the light receiver 20. Accordingly, the aberration of the image formed on the light receiver 20 is reduced, and thus the detection accuracy of the incident light L2 in the light receiver 20 can be increased.

Furthermore, according to the first embodiment, the projection/imaging dual purpose lens 50 is shared by the projection optical system 101 and the imaging optical system 102. Thus, designability of the headlight device 100 can be improved.

(First Modification of First Embodiment)

In the first embodiment described above, the description has been given of the configuration in which the headlight device 100 includes the projection/imaging dual-purpose lens 50. The headlight device 100 can be implemented even with a configuration including no projection/imaging dual-purpose lens 50. FIG. 6 is a side view schematically showing a main configuration of a headlight device 100a according to a first modification of the first embodiment. In FIG. 6, each component identical or corresponding to a component shown in FIG. 1 is assigned the same reference character as in FIG. 1.

As shown in FIG. 6, the headlight device 100a includes the light source part 10, the light receiver 20 and the beam splitter 30. In the first modification of the first embodiment, a projection optical system 101a is formed by the light source part 10 and the beam splitter 30. Thus, in the example shown in FIG. 6, the light L1 emitted from the light source part 10 is projected in the forward direction after passing through the beam splitter 30.

Further, in the first modification of the first embodiment, an imaging optical system 102a is formed by the beam splitter 30 and the light receiver 20. Thus, in the example shown in FIG. 6, the incident light L2 from the outside heads for the light receiver 20 after being reflected by the beam splitter 30.

According to the above-described first modification of the first embodiment, the beam splitter 30 is shared by the projection optical system 101a and the imaging optical system 102a of the headlight device 100a. Namely, part of the optical axis C1 of the projection optical system 101a coincides with part of the optical axis C2 of the imaging optical system 102a in the emission direction (specifically, in front of the beam splitter 30). Therefore, the process of adjusting the optical axis C1 of the projection optical system 101a and the optical axis C2 of the imaging optical system 102a is unnecessary in the headlight device 100a. Accordingly, it becomes easy to make the irradiation range of the light L1 emitted from the headlight device 100a and the incidence range of the incident light L2 incident on the headlight device 100a coincide with each other.

Further, according to the first modification of the first embodiment, the central part 32a sets the diameter of the light L21 traveling toward the light receiver 20 through the imaging optical system 102a (namely, the beam splitter 30) to be smaller than the diameter of the incident light L2 when entering the imaging optical system 102a (namely, the beam splitter 30). Therefore, the peripheral rays L22 included in the incident light L2 and traveling at positions far from the optical axis C1 become unlikely to be incident on the light receiver 20. Accordingly, the aberration of the image formed on the light receiver 20 is reduced, and thus the detection accuracy of the incident light L2 in the light receiver 20 can be increased.

Furthermore, according to the first modification of the first embodiment, the projection optical system 101a of the headlight device 100a is formed by the light source part 10 and the beam splitter 30 and the imaging optical system 102a is formed by the beam splitter 30 and the light receiver 20. With this configuration, the number of members forming the projection optical system 101a and the imaging optical system 102a is smaller in the headlight device 100a as compared to the headlight device 100 according to the first embodiment, and thus the headlight device 100a can be downsized.

(Second Modification of First Embodiment)

Figure 7:
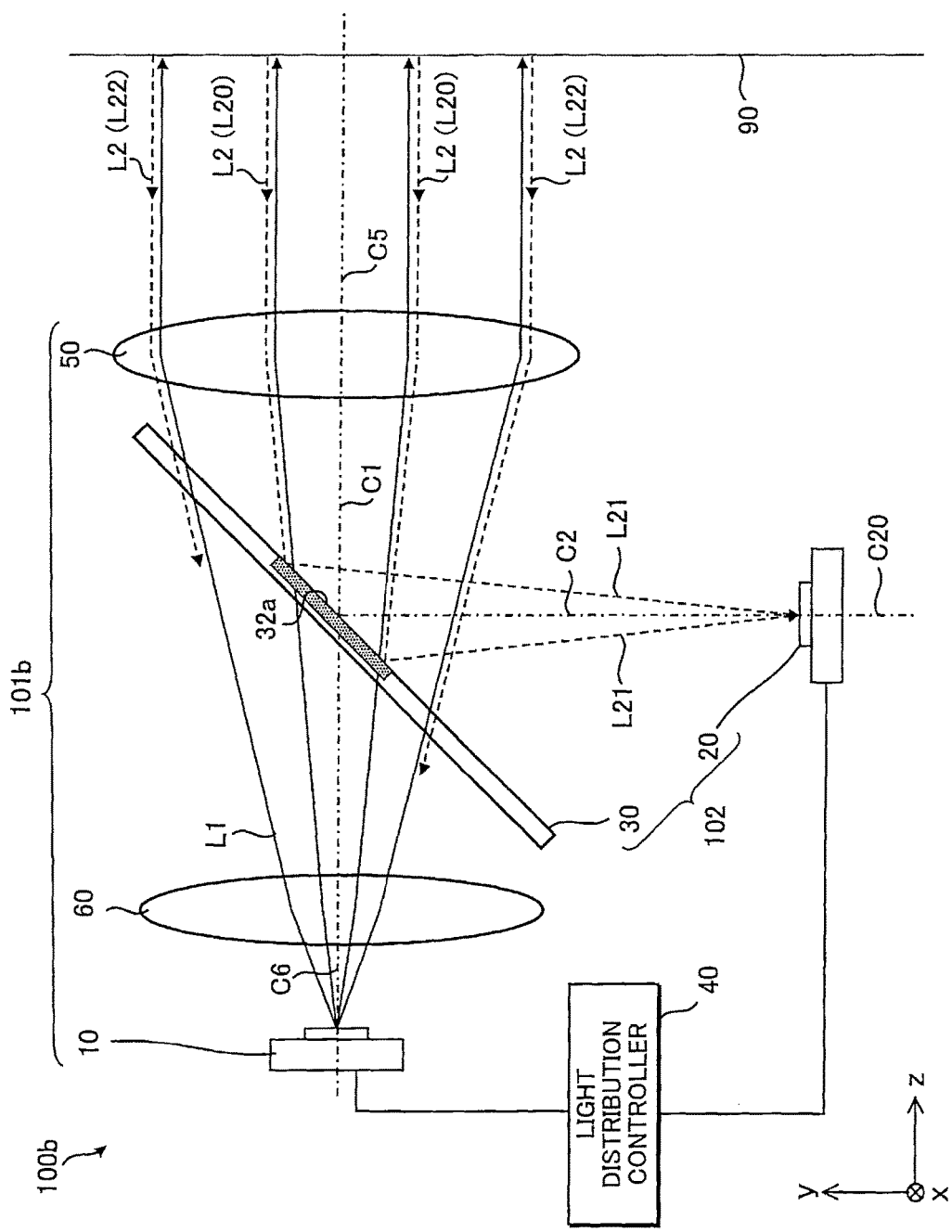
FIG. 7 is a side view schematically showing a main configuration a headlight device according to a second modification of the first embodiment.

In the first embodiment described earlier, the description has been given of the example in which the headlight device 100 includes the projection/imaging dual-purpose lens 50 as the second optical part. In a second modification of the first embodiment, a description will be given of an example in which the headlight device 100 further includes a condensing lens 60 in addition to the projection/imaging dual-purpose lens 50 as the second optical part. FIG. 7 is a side view schematically showing a main configuration of a headlight device 100b according to the second modification of the first embodiment. In FIG. 7, each component identical or corresponding to a component shown in FIG. 1 is assigned the same reference character as in FIG. 1.

As shown in FIG. 7, the headlight device 100b includes the light source part 10, the light receiver 20, the beam splitter 30, the projection/imaging dual-purpose lens 50 as a first optical member, and the condensing lens 60 as a second optical member. In the second modification of the first embodiment, the headlight device 100b includes a plurality of lenses (namely, the projection/imaging dual-purpose lens 50 and the condensing lens 60) as the second optical part. Further, in the second modification of the first embodiment, a projection optical system 101b is formed by the light source part 10, the beam splitter 30, the projection/imaging dual-purpose lens 50 and the condensing lens 60.

The condensing lens 60 is arranged on the optical path of the light L1 emitted from the light source part 10 and heading for the beam splitter 30. In the example shown in FIG. 7, the condensing lens 60 is arranged between the light source part 10 and the beam splitter 30. The condensing lens 60 has a function of condensing the light L1 emitted from the light source part 10 and directing the light toward the beam splitter 30. With this function, the condensing lens 60 is capable of modifying the light distribution pattern of the light incident light L1. Namely, the condensing lens 60 is a light distribution modification lens that modifies the light distribution pattern of the light L1. In the example shown in FIG. 7, the projection optical system 101b includes one condensing lens 60. Incidentally, the projection optical system 101b may also include a plurality of condensing lenses 60. Namely, the projection optical system 101b may include one or more condensing lenses 60. Incidentally, the second optical member that guides the light L1 emitted from the light source part 10 to the beam splitter 30 may also be formed by a combination of the condensing lens 60 and a reflecting mirror.

In FIG. 7, an optical axis of the condensing lens 60 is denoted by C6. The optical axis C10 of the light source part 10 and the optical axis C6 of the condensing lens 60 are situated on the same straight line. Namely, the optical axis C10 and the optical axis C6 coincide with each other. Incidentally, the headlight device 100b can be implemented even if the optical axis C10 and the optical axis C6 do not coincide with each other. The condensing lens 60 has a rotationally symmetric shape about the optical axis C6 as the rotation axis, for example. The condensing lens 60 may also be a lens having a rotationally asymmetric shape. The condensing lens 60 is an aspherical lens, for example. In this case, the sag amounts in the x-axis direction and the y-axis direction of the surface of the condensing lens 60 may differ from each other. Further, the sag amount on the +y-axis side relative to the optical axis C6 and the sag amount on the −y-axis side relative to the optical axis C6 may differ from each other. The surface of the condensing lens 60 may be a free-form surface. Furthermore, the surface of the condensing lens 60 may be eccentric with respect to the optical axis C6. Moreover, the surface of the condensing lens 60 can be inclined in the y-axis direction with respect to a direction orthogonal to the optical axis C6. The condensing lens 60 is formed of plastic material such as PC (polycarbonate) resin or glass material, for example. While a case where the headlight device 100b includes the projection/imaging dual-purpose lens 50 has been described in the example shown in FIG. 7, the headlight device 100b can be implemented even without the projection/imaging dual-purpose lens 50.

According to the above-described second modification of the first embodiment, the beam splitter 30 and the projection/imaging dual-purpose lens 50 are shared by the projection optical system 101b and the imaging optical system 102 of the headlight device 100b. Namely, part of the optical axis C1 of the projection optical system 101b coincides with part of the optical axis C2 of the imaging optical system 102 in the emission direction (specifically, in front of the beam splitter 30). Therefore, the process of adjusting the optical axis C1 of the projection optical system 101b and the optical axis C2 of the imaging optical system 102 is unnecessary in the headlight device 100b. Accordingly, it becomes easy to make the irradiation range of the light L1 emitted from the headlight device 100*b* and the incidence range of the incident light L2 incident on the headlight device 100*b* coincide with each other.

Further, according to the second modification of the first embodiment, the central part 32*a* sets the diameter of the light L21 traveling toward the light receiver 20 through the imaging optical system 102 (namely, the beam splitter 30) to be smaller than the diameter of the incident light L2 when entering the imaging optical system 102 (namely, the projection/imaging dual-purpose lens 50). Therefore, the peripheral rays L22 included in the incident light 12 and traveling at positions far from the optical axis C1 become unlikely to be incident on the light receiver 20. Accordingly, the aberration of the image formed on the light received 20 is reduced, and thus the detection accuracy of the incident light 12 in the light receiver 20 can be increased.

Furthermore, according to the second modification of the first embodiment, the projection optical system 101*b* of the headlight device 100*b* includes the condensing lens 60 arranged on the optical path of the light L1 emitted from the light source part 10 and heading for the beam splitter 30. With this configuration, it is possible to project the light L1 in the forward direction after modifying the light distribution pattern of the light L1 with the condensing lens 60. Therefore, the degree of freedom in the design of the light distribution pattern of the light L1 can be increased.

(Third Modification of First Embodiment)

Figure 8:
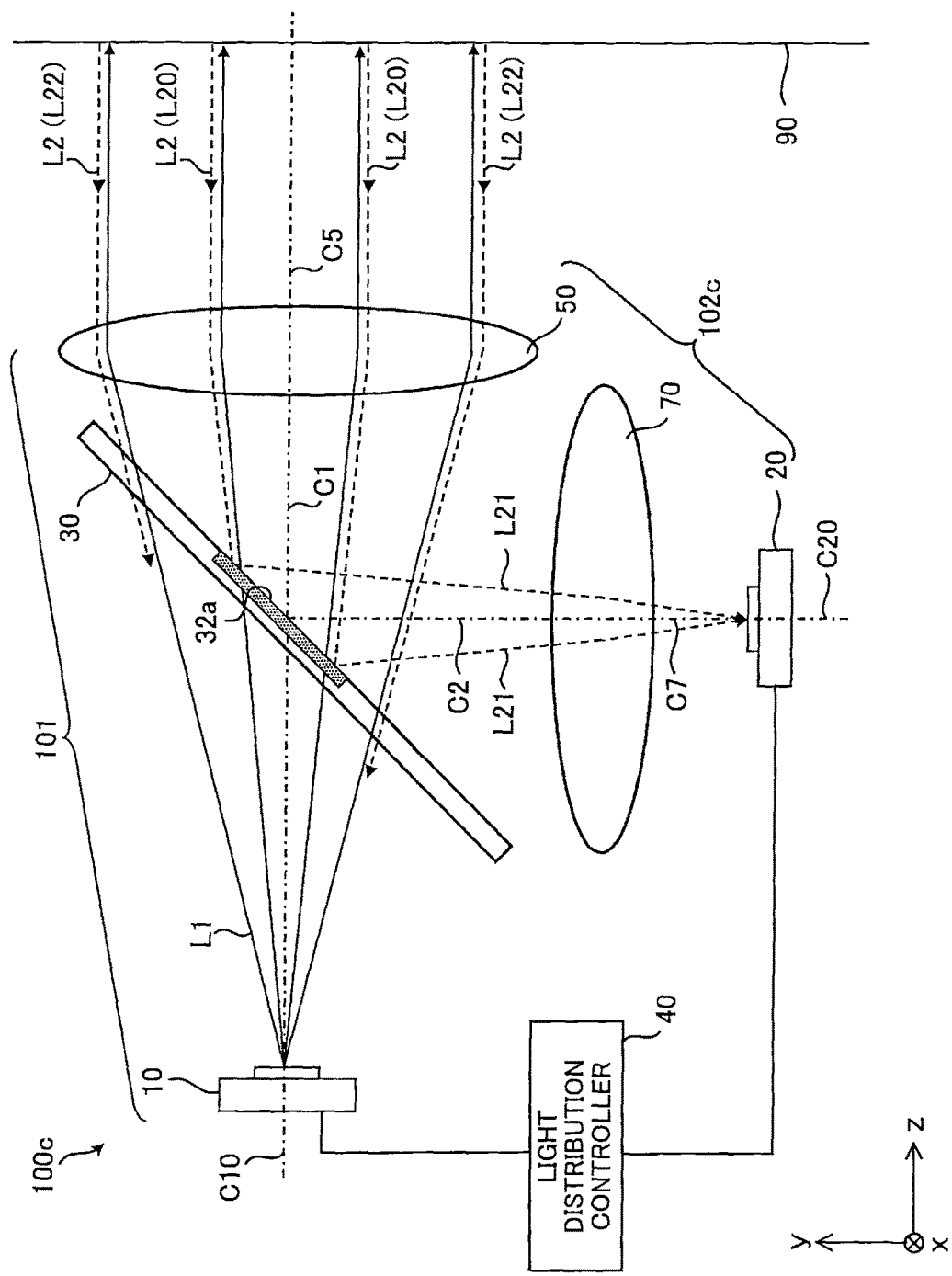
FIG. 8 is a side view schematically showing a main configuration of a headlight device according to a third modification of the first embodiment.

In the first embodiment described earlier, the description has been given of the example in which the headlight device 100 includes the projection/imaging dual-purpose lens 50 as the second optical part. In a third modification of the first embodiment, a description will be given of an example in which a headlight device 100*c* includes an imaging lens 70 in addition to the projection/imaging dual-purpose lens 50 as the second optical part. FIG. 8 is a side view schematically showing a main configuration of the headlight device 100*c* according to the third modification of the first embodiment. In FIG. 8, each component identical or corresponding to a component shown in FIG. 1 is assigned the same reference character as in FIG. 1.

As shown in FIG. 8, the headlight device 100*c* includes the light source part 10, the light receiver 20, the beam splitter 30, the projection/imaging dual purpose lens 50 as the first optical member, and the imaging lens 70 as a third optical member. In the third modification of the first embodiment, the headlight device 100*b* includes a plurality of lenses (namely, the projection/imaging dual-purpose lens 50 and the imaging lens 70) as the second optical part. Further, in the third modification of the first embodiment, an imaging optical system 102*c* is formed by the projection/imaging dual-purpose lens 50, the beam splitter 30, the imaging lens 70 and the light receiver 20.

The imaging lens 70 is arranged on the optical path of the light L21 heading for the light receiver 20 through the beam splitter 30. In the example shown in FIG. 8, the imaging lens 70 is arranged between the beam splitter 30 and the light receiver 20. The imaging lens 70 has a function of focusing the light L21 reflected by the beam splitter 30 on the light receiver 20 to form an image. The imaging lens 70 can be either a spherical lens or an aspherical lens.

In FIG. 8, an optical axis of the imaging lens 70 is indicated as an optical axis C7. In the example shown in FIG. 8, the optical axis C7 coincides with the optical axis C5 of the projection/imaging dual-purpose lens 50 on the +z-axis side of the beam splitter 30. In the case where the optical axis C7 and the optical axis C5 coincide with each other, it is easy to guide the central light flux L20, which is included in the incident light L2 and traveling on the optical axis C1, to the light receiver 20. Therefore, the aberration of the image formed on the light receiver 20 is reduced and the detection accuracy of the incident light L2 in the light receiver 20 can be increased.

The imaging lens 70 is formed of plastic material such as PMMA (polymethyl methacrylate) resin or glass material, for example. By providing the imaging optical system 102*c* with the imaging lens 70, the number of optical surfaces controlling the light 121 incident on the light receiver 20 increases. Thus, the degree of freedom in the design of the imaging optical system 102*c* can be increased. Incidentally, the third optical member that guides the incident light 12 reflected by the beam splitter 30 to the light receiver 20 may also be formed by a combination of the imaging lens 70 and a reflecting mirror.

In the example shown in FIG. 8, the beam splitter 30 is arranged between the projection/imaging dual-purpose lens 50 and the imaging lens 70. Accordingly, in the imaging optical system 102*c*, the beam splitter 30 achieves an effect equivalent to an aperture provided inside an ordinary imaging optical system. Specifically, the beam splitter 30 is capable of restricting the light incident on the light receiver 20 to the central light flux L20 traveling on the optical axis C1 and in the vicinity of the optical axis C1, namely, in the paraxial region. Therefore, the vignetting of rays in the image formed on the light receiver 20 can be prevented. Accordingly, the limb darkening on the light receiving surface of the light receiver 20 can be reduced.

Further, the imaging optical system 102*c* is a symmetric optical system with respect to a plane including the light reflecting surface 32 of the beam splitter 30 or an optical system similar to such symmetric optical system. With this configuration, distortion in the image formed on the light receiver 20 can be reduced. Therefore, the limb darkening on the light receiving surface of the light receiver 20 can be reduced. Incidentally, while a case where the headlight device 100*c* includes the projection/imaging dual-purpose lens 50 has been described in the example shown in FIG. 8, the headlight device 100*c* can be implemented even without the projection/imaging dual-purpose lens 50.

According to the above-described third modification of the first embodiment, the beam splitter 30 and the projection/imaging dual-purpose lens 50 are shared by the projection optical system 101 and the imaging optical system 102*c* of the headlight device 100*c*. Namely, part of the optical axis C1 of the projection optical system 101 coincides with part of the optical axis C2 of the imaging optical system 102*c* in the emission direction (specifically, in front of the beam splitter 30). Therefore, the process of adjusting the optical axis C1 of the projection optical system 101 and the optical axis C2 of the imaging optical system 102*c* is unnecessary in the headlight device 100*c*. Accordingly, it becomes easy to make the irradiation range of the light L1 emitted from the headlight device 100*c* and the incidence range of the incident light L2 incident on the headlight device 100*c* coincide with each other.

Further, according to the third modification of the first embodiment, the central part 32*a* sets the diameter of the light L21 traveling toward the light receiver 20 through the imaging optical system 102*c* (namely, the beam splitter 30) to be smaller than the diameter of the incident light L2 when entering the imaging optical system 102*c* (namely, the projection/imaging dual-purpose lens 50). The peripheral rays L22 included in the incident light L2 and traveling at positions far from the optical axis C1 become unlikely to be incident on the light receiver 20. Accordingly, the aberration of the image formed on the light receiver 20 is reduced. Thus, the detection accuracy of the incident light L2 in the light receiver 20 can be increased.

Furthermore, according to the third modification of the first embodiment, the imaging optical system 102c of the headlight device 100c includes the imaging lens 70 arranged on the optical path of the light L21 heading for the light receiver 20 through the beam splitter 30. Accordingly, the number of optical surfaces controlling the light L21 incident on the light receiver 20 increases. Thus, the degree of freedom in the design of the imaging optical system 102c can be increased.

(Fourth Modification of First Embodiment)

Figure 9:
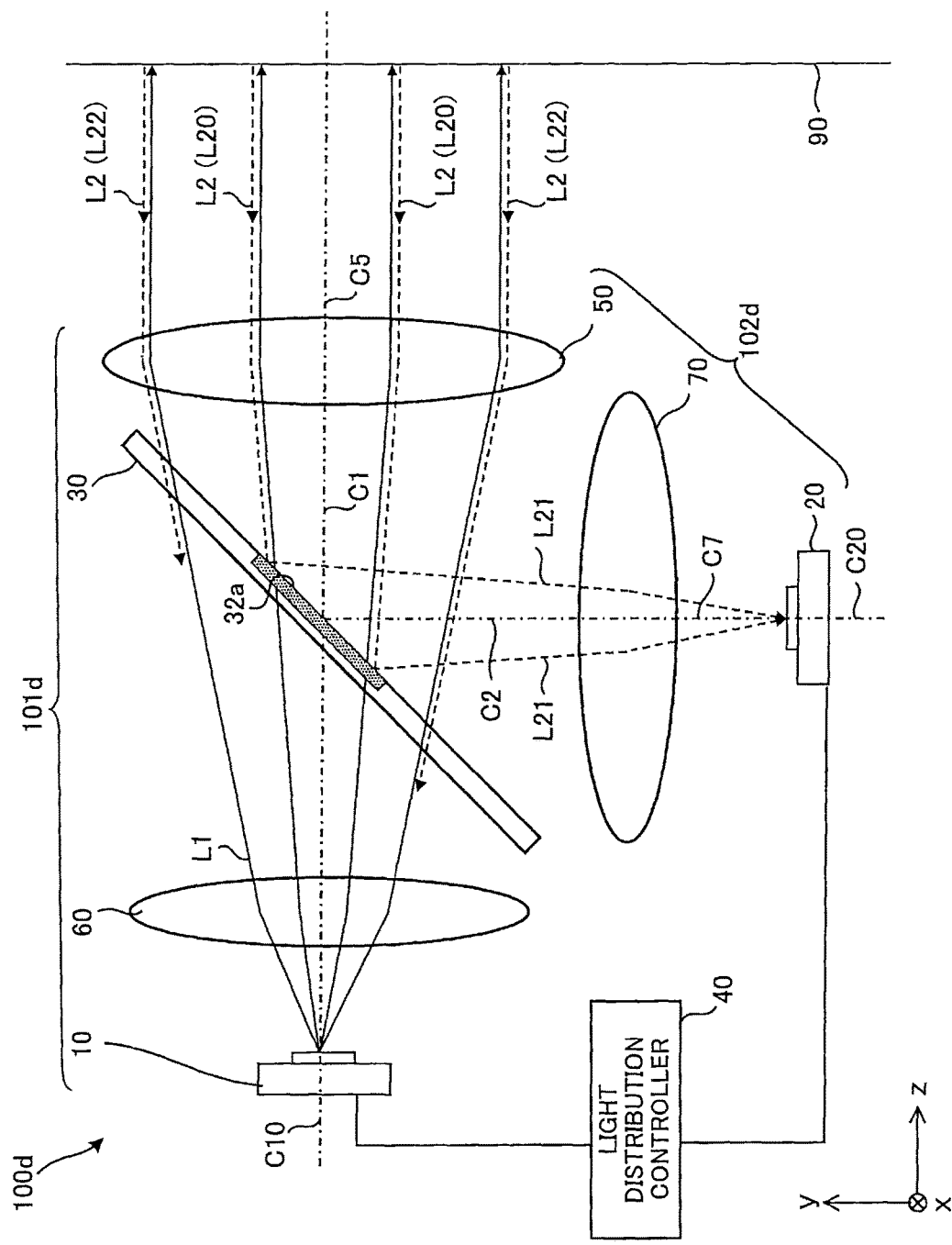
FIG. 9 is at side view schematically configuration headlight device according to a fourth modification of the first embodiment.

In the first embodiment described earlier, the description has been given of the example in which the headlight device 100 includes the projection/imaging dual-purpose lens 50. In a fourth modification of the first embodiment, a description will be given of an example in which a headlight device 100d includes the condensing lens 60 described in the second modification of the first embodiment and the imaging lens 70 described in the third modification of the first embodiment in addition to the projection/imaging dual-purpose lens 50. FIG. 9 is a side view schematically showing a main configuration of the headlight device 100d according to the fourth modification of the first embodiment. In FIG. 9, each component identical or corresponding to a component shown in FIG. 1 is assigned the same reference character as in FIG. 1.

As shown in FIG. 9, the headlight device 100d includes the light source part 10, the light receiver 20, the beam splitter 30, the projection/imaging dual-purpose lens 50, the condensing lens 60 and the imaging lens 70. In the fourth modification of the first embodiment, the projection optical system 101d is formed by the light source part 10, the condensing lens 60, the beam splitter 30 and the projection/imaging dual-purpose lens 50. Further, an imaging optical system 102d is formed by the projection/imaging dual-purpose lens 50, the beam splitter 30, the imaging lens 70 and the light receiver 20. Thus, the beam splitter 30 and the projection/imaging dual-purpose lens 50 are shared by the projection optical system 101d and the imaging optical system 102d of the headlight device 100d.

According to the above-described fourth modification of the first embodiment, the beam splitter 30 and the projection/imaging dual-purpose lens 50 are shared by the projection optical system 101d and the imaging optical system 102d of the headlight device 100d. Namely, part of the optical axis C1 of the projection optical system 101d coincides with part of the optical axis C2 of the imaging optical system 102d in the emission direction (specifically, in front of the beam splitter 30). Therefore, the process of adjusting the optical axis C1 of the projection optical system 101d and the optical axis C2 of the imaging optical system 102d is unnecessary in the headlight device 100d. Accordingly, it becomes easy to make the irradiation range of the light L1 emitted from the headlight device 100d and the incidence range of the incident light L2 incident on the headlight device 100d coincide with each other.

Further, according to the fourth modification of the first embodiment, the central part 32a sets the diameter of the light L21 traveling toward the light receiver 20 through the imaging optical system 102d (namely, the beam splitter 30) to be smaller than the diameter of the incident light L2 when entering the imaging optical system 102d (namely, the projection/imaging dual-purpose lens 50). The peripheral rays 122 included in the incident light L2 and traveling at positions far from the optical axis C1 become unlikely to be incident on the light receiver 20. Accordingly, the aberration of the image formed on the light receiver 20 is reduced. Thus, the detection accuracy of the incident light 12 in the light receiver 20 can be increased.

Furthermore, according to the fourth modification of the first embodiment, the projection optical system 101d includes the condensing lens 60 arranged on the optical path of the light L1 emitted from the light source part 10 and heading for the beam splitter 30, and the imaging optical system 102d includes the imaging lens 70 arranged on the optical path of the light L21 heading for the light receiver 20 through the beam splitter 30. With this configuration, the degree of freedom in the design of the light distribution pattern of the light L1 can be increased and the degree of freedom in the design of the imaging optical system 102d can be increased.

(Fifth Modification of First Embodiment)

Figure 10:
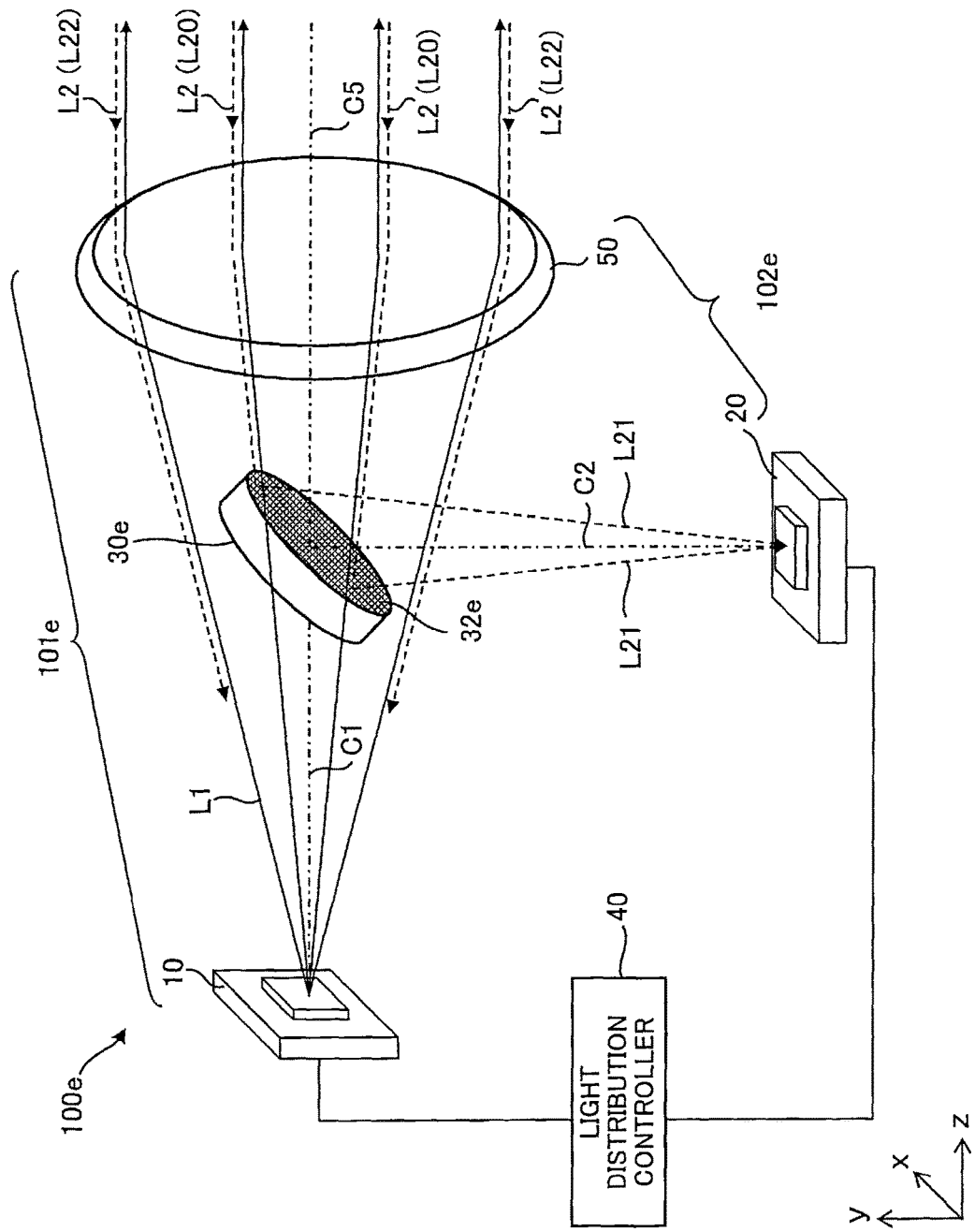
FIG. 10 is a perspective view schematically showing a main configuration of a headlight device according to a fifth modification of the first embodiment.

In the first embodiment described earlier, the description has been given of the example in which the beam splitter 30 includes the central part 32a arranged on the optical axis C1 and the peripheral part 32b arranged on the outer side relative to the central part 32a. In a fifth modification of the first embodiment, a description will be given of an example in which a beam splitter 30e includes a central part 32e only. FIG. 10 is a perspective view schematically showing a main configuration of a headlight device 100e according to the fifth modification of the first embodiment. In FIG. 10, each component identical or corresponding to a component shown in FIG. 3 is assigned the same reference character as in FIG. 3.

As shown in FIG. 10, the headlight device 100e includes the light source part 10, the light receiver 20, the beam splitter 308 and the projection/imaging dual-purpose lens 50. In the fifth modification of the first embodiment, a projection optical system 101e is formed by the light source part 10, the beam splitter 30e and the projection/imaging dual-purpose lens 50, and an imaging optical system 102e is formed by the projection/imaging dual-purpose lens 50, the beam splitter 30e and the light receiver 20.

The projection optical system 101e and the imaging optical system 102e share the beam splitter 30e and the projection/imaging dual-purpose lens 50. Thus, the projection optical system 101e and the imaging optical system 102e have the common optical axis C5. Namely, part of the optical axis C1 of the projection optical system 101e coincides with part of the optical axis C2 of the imaging optical system 102e in the emission direction. Accordingly, it becomes easy to make the irradiation range of the light L1 emitted from the headlight device 100e and the incidence range of the incident light L2 incident on the headlight device 100e coincide with each other.

The beam splitter 30e includes the central part 32e as the aperture part arranged on the optical axis C1. The central part 32e reflects part of the incident light L2 traveling in the incidence direction (i.e., the central light flux L20) and guides the reflected light to the light receiver 20. Namely, the central part 32e is a light reflecting part that reflects the central light flux L20 included in the incident light L2 and traveling in the paraxial region.

Further, in the fifth modification of the first embodiment, the shape of the central part 32e is a circular shape, for example. Incidentally, the shape of the central part 32e may also be an elliptic shape or a different shape. The diameter of the central part 32e is smaller than the diameter of the incident light L2 when entering the imaging optical system 102e. Therefore, the peripheral rays L22 included in the incident light L2 and traveling at positions far from the optical axis C1 become unlikely to be incident on the light receiver 20. Accordingly, the aberration of the image formed on the light receiver 20 is reduced. Thus, the detection accuracy of the incident light L2 in the light receiver 20 can be increased.

In the fifth modification of the first embodiment, the light L1 emitted from the light source part 10 passes through the central part 32e and also passes through a region on the outer side relative to the beam splitter 30e.

According to the above-described fifth modification of the first embodiment, in the headlight device 100e, part of the optical axis C1 of the projection optical system 101e coincides with part of the optical axis C2 of the imaging optical system 102e in the emission direction (namely, in front of the beam splitter 30). Therefore, the process of adjusting the optical axis C1 of the projection optical system 101e and the optical axis C2 of the imaging optical system 102e is unnecessary in the headlight device 100e. Accordingly, it becomes easy to make the irradiation range of the light L1 emitted from the headlight device 100e and the incidence range of the incident light L2 incident on the headlight device 100e coincide with each other.

Further, according to the fifth modification of the first embodiment, the imaging optical system 102e of the headlight device 100e includes the beam splitter 30e that reflects part of the incident light L2 and guides the reflected light to the light receiver 20, and the beam splitter 30e includes the central part 32e as the aperture part. The central part 32e guides the central light flux L20 included in the incident light L2 to the light receiver and sets the diameter of the light L21 traveling toward the light receiver 20 through the imaging optical system 102e to be smaller than the diameter of the incident light L2 when entering the imaging optical system 102e. Therefore, the peripheral rays L22 included in the incident light L2 and traveling at positions far from the optical axis C1 become unlikely to be incident on the light receiver 20. Accordingly, the aberration of the image formed on the light receiver 20 is reduced. Thus, the detection accuracy of the incident light L2 in the light receiver 20 can be increased.

(Sixth Modification of First Embodiment)

Figure 11:
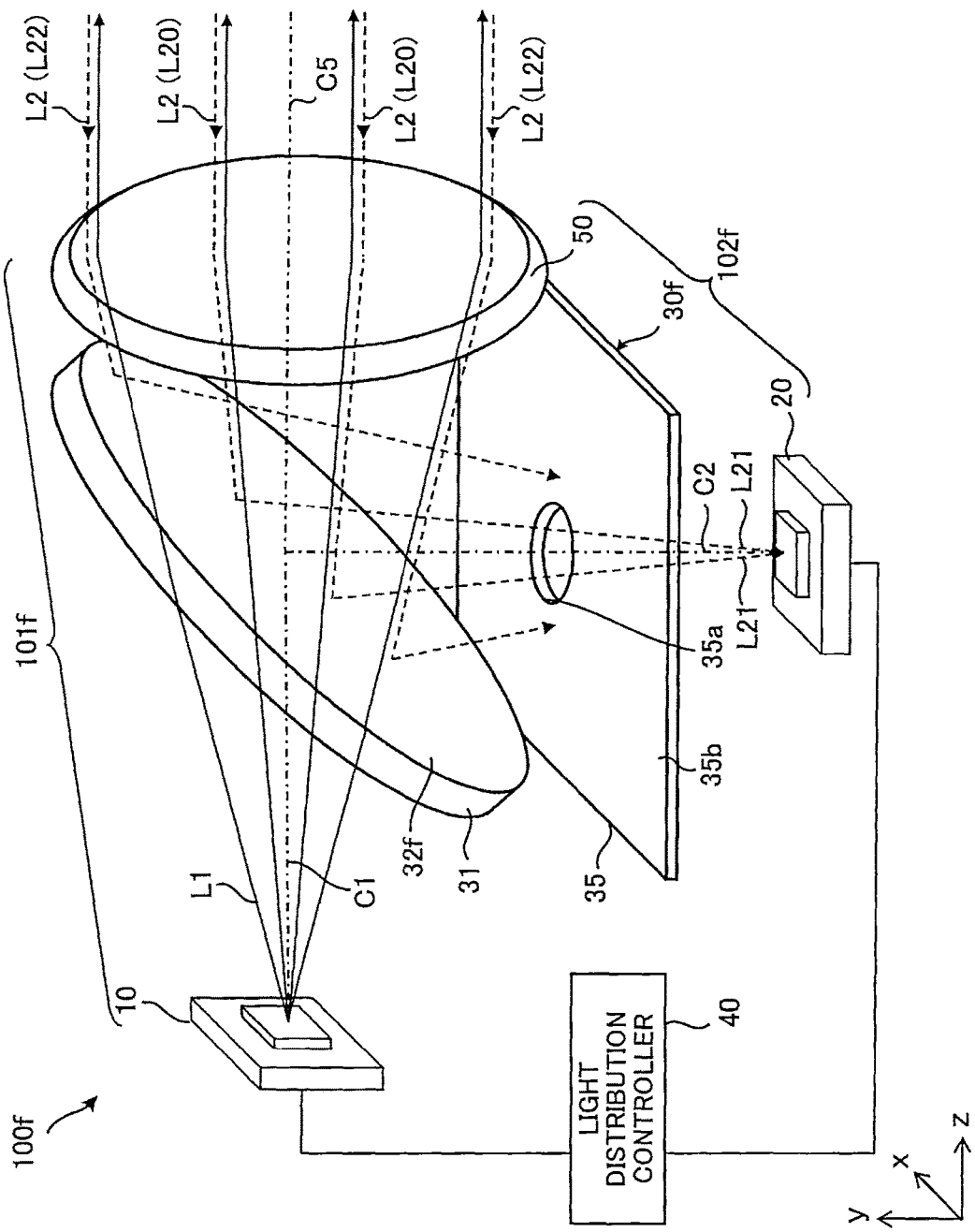
FIG. 11 is a perspective view schematically showing a main configuration of a headlight device according to a sixth modification of the first embodiment.

In the first embodiment described earlier, the description has been given of the example in which the aperture part is provided in the beam splitter 30 that reflects part of the incident light L2 and guides the reflected light to the light receiver 20. In a sixth modification of the first embodiment, a description will be given of an example in which the aperture part is a part separate from the beam splitter 30. FIG. 11 is a perspective view schematically showing a main configuration of a headlight device 100f according to the sixth modification of the first embodiment. In FIG. 11, each component identical or corresponding to a component shown in FIG. 3 is assigned the same reference character as in FIG. 3.

As shown in FIG. 11, the headlight device 100f includes the light source part 10, the light receiver 20, a first optical part, 30f and the projection/imaging dual-purpose lens 50. The first optical part 30f includes a beam splitter 31 and a light blocking plate 35 as the aperture part. The beam splitter 31 is arranged on the optical axis C1. The beam splitter 31 reflects part of the incident light L2 traveling in the incidence direction and directs the reflected light toward the light blocking plate 35. In the sixth modification of the first embodiment, a projection optical system 101f is formed by the light source part 10, the beam splitter 31 and the projection/imaging dual-purpose lens 50. Further, in the sixth modification of the first embodiment, an imaging optical system 102f is formed by the projection/imaging dual-purpose lens 50, the beam splitter 31, the light blocking plate 35 and the light receiver 20.

The projection optical system 101f and the imaging optical system 102f share the beam splitter 31 and the projection/imaging dual-purpose lens 50. Thus, the projection optical system 101f and the imaging optical system 102f have the common optical axis C5 in front of the beam splitter 31. Namely, part of the optical axis C1 of the projection optical system 101f coincides with part of the optical axis C2 of the imaging optical system 102f in the emission direction. Accordingly, it becomes easy to make the irradiation range of the light L1 emitted from the headlight device 100f and the incidence range of the incident light L2 incident on the headlight device 100f coincide with each other.

The light blocking plate 35 is a light blocking member arranged between the beam splitter 31 and the light receiver 20 in the y-axis direction. The light blocking plate 35 has an opening 35a as the aperture part. A part of the light blocking plate 35 excluding the opening 35a is a light blocking part 35b that blocks the peripheral rays L22 included in the incident light L2 reflected by the beam splitter 31.

In the example shown in FIG. 11, the opening 35a is situated on the optical axis C20 of the light receiver 20. The opening 35a transmits the central light flux L20, as part of the incident light L2 reflected by the beam splitter 31 and heading for the light receiver 20, as the light L21. The opening 35a is smaller than the diameter of the incident light L2 when entering the imaging optical system 102f (namely, the projection/imaging dual-purpose lens 50). With this configuration, the opening 35a sets the diameter of the light L21 traveling toward the light receiver 20 through the imaging optical system 102f (namely, the light blocking plate 35) to be smaller than the diameter of the incident light L2 when entering the imaging optical system 102f (namely, the projection/imaging dual-purpose lens 50). Incidentally, the position of the light blocking plate 35 is not limited to the position between the beam splitter 31 and the light receiver 20. The light blocking plate 35 may also be arranged on the +z-axis side relative to the beam splitter 31 (for example, between the beam splitter 31 and the projection/imaging dual-purpose lens 50). Further, in a case where the headlight device 100f includes the imaging lens 70 shown in FIG. 8 or 9, the light blocking plate 35 may be provided on the imaging lens 70 or in the vicinity of the imaging lens 70.

According to the above described sixth modification of the first embodiment, in the headlight device 100f, part of the optical axis C1 of the projection optical system 101f coincides with part of the optical axis C2 of the imaging optical system 102f in the emission direction (specifically, in front of the beam splitter 31). Therefore, the process of adjusting the optical axis C1 of the projection optical system 101f and the optical axis C2 of the imaging optical system 102f is unnecessary in the headlight device 100f. Accordingly, it becomes easy to make the irradiation range of the light L1 emitted from the headlight device 100f and the incidence range of the incident light L2 incident on the headlight device 100f coincide with each other.

Further, according to the sixth modification of the first embodiment, the imaging optical system 102f of the headlight device 100f includes the light blocking plate 35 as the aperture part including the opening 35a, and the opening 35a is smaller than the diameter of the incident light L2 when entering the imaging optical system 102f. With this configuration, the opening 35a sets the diameter of the light L21 traveling toward the light receiver 20 through the imaging optical system 102f to be smaller than the diameter of the incident light L2 when entering the imaging optical system 102f. Therefore, the peripheral rays L22 included in the incident light L2 and traveling at positions far from the optical axis C1 become unlikely to be incident on the light receiver 20. Accordingly, the aberration of the image formed on the light receiver 20 is reduced, and thus the detection accuracy of the incident light L2 in the light receiver 20 can be increased.

Second Embodiment

In the first embodiment described earlier, the description has been given of the example in which the light included in the incident light L2 and reflected by the central part 32a of the beam splitter 30 is incident on the light receiver 20. In a second embodiment, a description will be given of an example in which the area and the reflectance of the central part 32a are specified. Except for this feature, a headlight device according to the second embodiment is the same the headlight device 100 according to the first embodiment. Thus, FIGS. 1 to 3 are referred to in the following description.

In the second embodiment, the area of the central part 32a is less than or equal to 20% of the area of the light reflecting surface 32. Namely, the bundle of rays of the light L21 when being incident on the light receiver 20 is limited to be smaller than or equal to 20% of an effective cross-sectional area of the bundle of rays of the incident light L2 when entering the imaging optical system 102 (the projection/imaging dual-purpose lens 50 in the example shown in FIGS. 1 to 3). Accordingly, the aberration of the image formed on the light receiving surface of the light receiver 20 can be reduced as compared to a configuration in which the beam splitter is a half mirror. Further, in the case where the beam splitter is a half mirror, the illuminating light passing through the optical member and the incident light reflected by the optical member are uniform. In contrast, with the condition that the area of the central part 32a is less than or equal to 20% of the area of the light reflecting surface 32, the amount of light included in the light L1 and passing through the peripheral part 32b is large, while the amount of light included in the light and passing through the vicinity of the optical axis C1 is small. Therefore, the maximum luminosity of the light L1 passing through the beam splitter 30 can be set higher than or equivalent to the maximum luminosity of the illuminating light when passing through the half mirror.

Further, in the second embodiment, the reflectance of the central part 32s is higher than 50% and less than or equal to 100%. Accordingly, when a half mirror is employed for the peripheral part 32b, the central light flux 120 included in the incident light L2 and traveling in the paraxial region of the optical axis C1 becomes more likely to be incident on the light receiver 20 as compared to a configuration in which the whole of the beam splitter is a half mirror.

Figure 12:
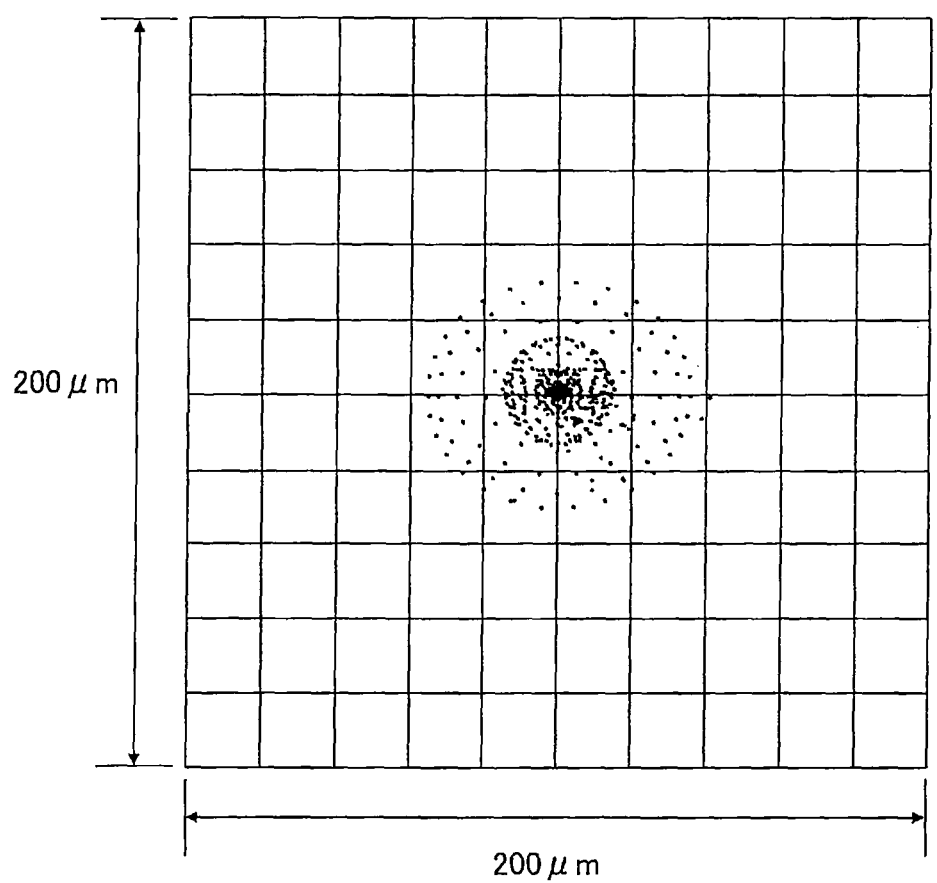
FIG. 12 is a diagram showing an example of a spot diagram of light incident on the light receiver of a headlight device according to a second embodiment.

FIG. 12 is a diagram showing an example of a spot diagram of light incident on the light receiver 20 of the headlight device according to the second embodiment. The spot diagram shown in FIG. 12 is a spot diagram at an intersection point of the light receiving surface 22 (see FIG. 5) and the optical axis C20 of the light receiver 20. In the spot diagram shown in FIG. 12, an RMS (Root Mean Square) radius indicating a spot size, which is distribution of intersection points of the light L21 and the light receiving surface 22 of the light receiver 20, is 15.338 µm.

Figure 13:
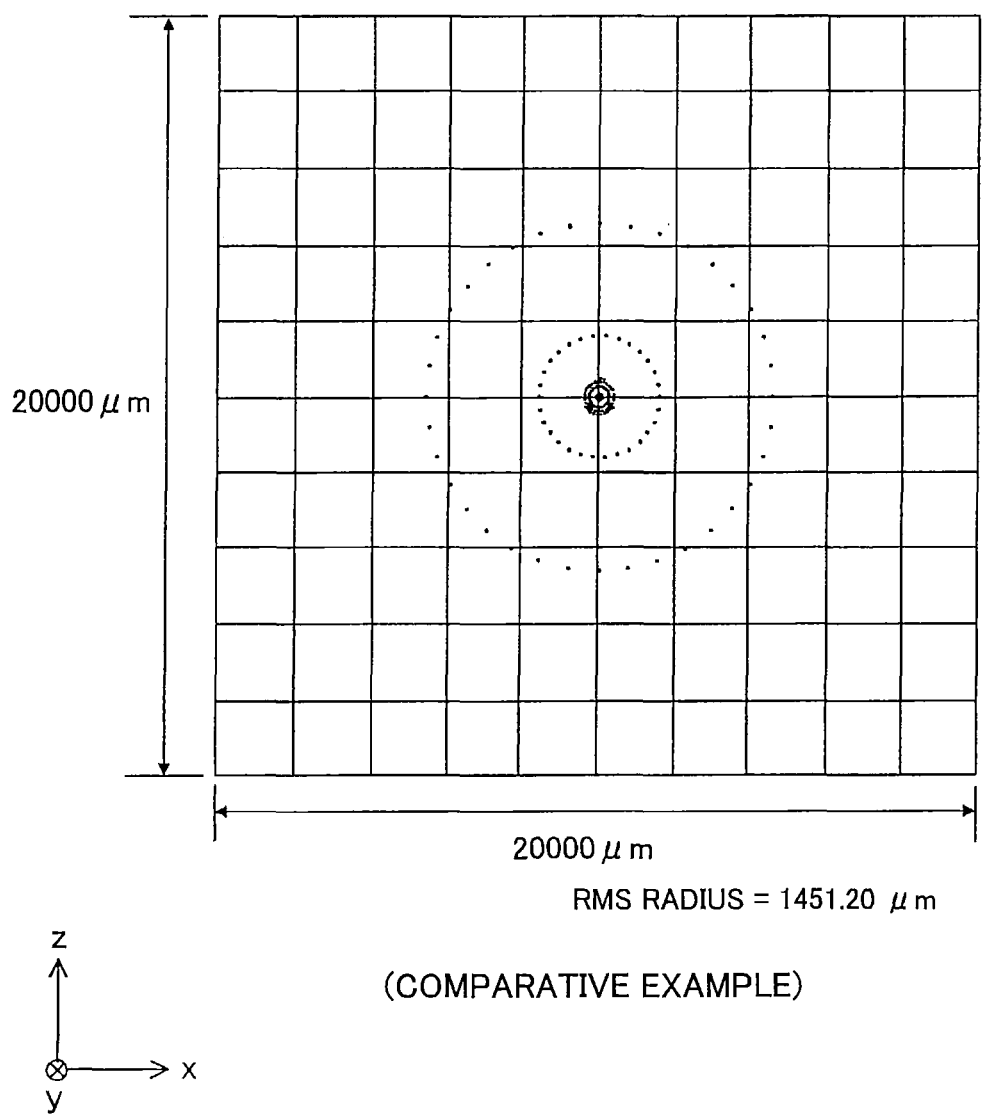
FIG. 13 is a diagram showing an example of a spot diagram of light incident on the light receiver of a headlight device according to a comparative example.

FIG. 13 is a diagram showing an example of a spot diagram of light incident on the light receiver of a headlight device according to a comparative example. The headlight device according to the comparative example differs from the headlight device according to the second embodiment in that the optical member is a half mirror. The spot diagram shown in FIG. 13 is a spot diagram at a central position of the light receiving surface 22 where the incidence angle of the ray with respect to the optical axis of the light receiver is 0 degrees. In the spot diagram shown in FIG. 13, the RMS radius indicating the spot size of the light is 1451.20 µm. Thus, with the condition that the area of the central part 32a is less than or equal to 20% of the area of the light reflecting surface 32 and the reflectance of the central part 32a is higher than 50% and less than or equal to 100%, the spot size of the image formed on the light receiving surface 22 can be made small. The spot size (area) in the headlight device according to the second embodiment is approximately 14% assuming that the central part 32a is 20% of the light reflecting surface 32 in the area and in a circular shape, for example. If the area of the central part 32a is reduced further, the spot size (area) in the headlight device according to the second embodiment is considered to become smaller than approximately 14%.

According to the second embodiment described above, the area of the central part 32a is less than or equal to 20% of the area of the light reflecting surface 32 and the reflectance of the central part 32a is higher than 50% and less than or equal to 100%. With this condition, the aberration of the image formed on the light receiver 20 can be reduced and the detection accuracy of the incident light L2 in the light receiver 20 can be increased.

Third Embodiment

Figure 14:
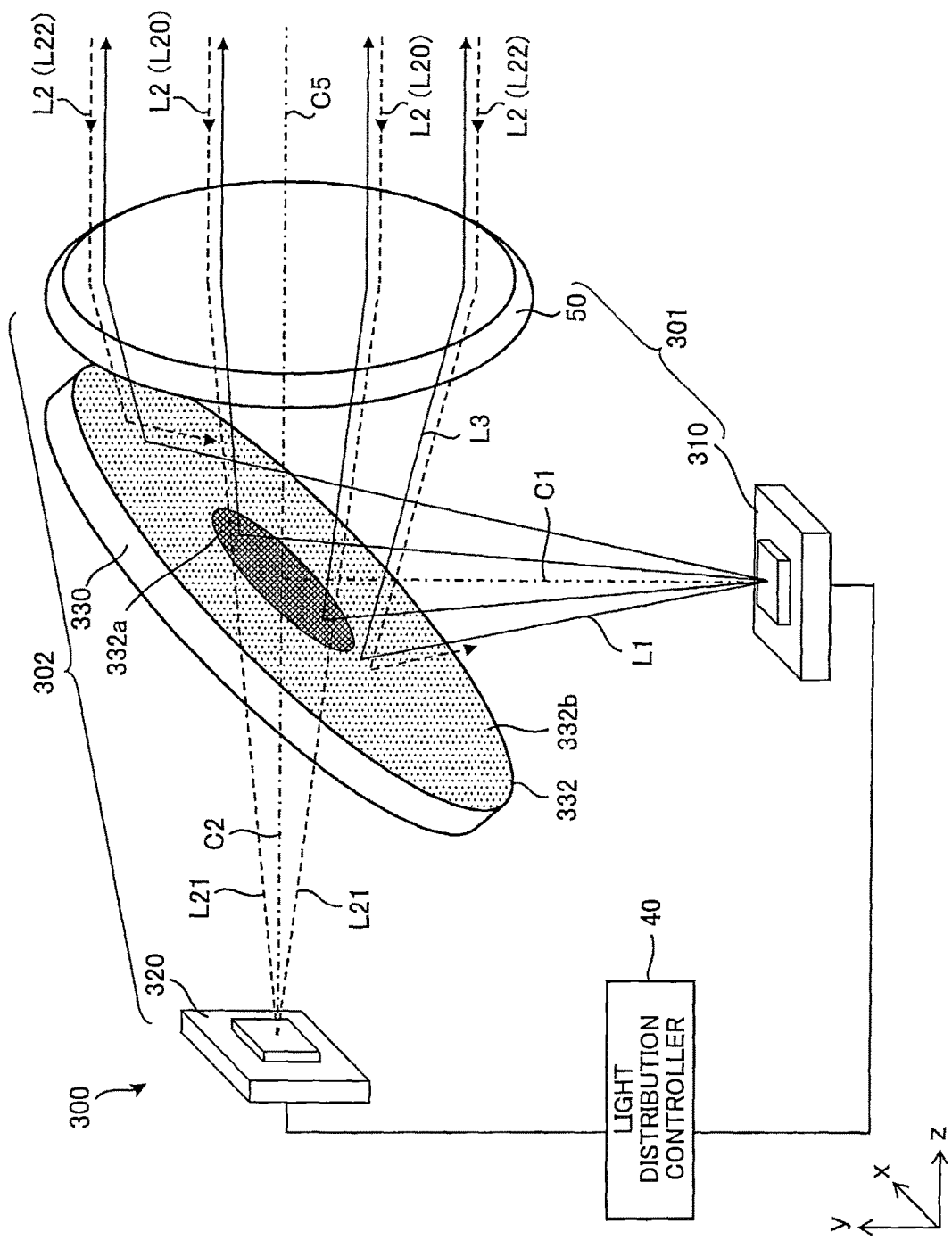
FIG. 14 is a perspective view schematically showing a main configuration of a headlight device according to a third embodiment.

In the first embodiment described earlier, the description has been given of the example in which the light L1 emitted from the light source part 10 passes through the beam splitter 30 and is emitted in the emission direction and the incident light L2 is reflected by the beam splitter 30 and is incident on the light receiver 20. In a third embodiment, a description will be given of an example in which the light L1 omitted from a light source part 310 is reflected by a beam splitter 330 and is emitted in the emission direction and the incident light L2 passes through the beam splitter 330 and is incident on a light receiver 320. FIG. 14 is a perspective view schematically showing a main configuration of a headlight device 300 according to the third embodiment. In FIG. 14, each component identical or corresponding to a component shown in FIG. 1 is assigned the same reference character as in FIG. 1.

As shown in FIG. 14, the headlight device 300 includes the light source part 310, the light receiver 320, the beam splitter 330 as the first optical part, and the projection/imaging dual-purpose lens 50. The beam splitter 330 is arranged on the optical axis C1. In the third embodiment, a projection optical system 301 is formed by the light source part 310, the beam splitter 330 and the projection/imaging dual-purpose lens 50, and an imaging optical system 302 is formed by the projection/imaging dual-purpose lens 50, the beam splitter 330 and the light receiver 320.

The projection optical system 301 and the imaging optical system 302 share the beam splitter 330 and the projection/imaging dual-purpose lens 50. Thus, the projection optical system 301 and the imaging optical system 302 have the common optical axis C5 in front of the beam splitter 330. Namely, part of the optical axis C1 of the projection optical system 301 coincides with part of the optical axis C2 of the imaging optical system 302 in the emission direction. Therefore, the process of adjusting the optical axis C1 of the projection optical system 301 and the optical axis C2 of the imaging optical system 302 is unnecessary in the headlight device 300. Accordingly, it becomes easy to make the irradiation range of the light L1 emitted from the headlight device 300 and the incidence range of the incident light L2 incident on the headlight device 300 coincide with each other.

In the example shown in FIG. 14, the light source part 310 is arranged at a position on the −y-axis side relative to the beam splitter 330. The beam splitter 330 reflects the light L1 incident from the −y-axis side and emits the reflected light to the +z-axis side as light L3. Incidentally, the light source part 310 may also be arranged at a position on the +y-axis side relative to the beam splitter 330.

The light receiver 320 is arranged at a position on the axis side relative to the beam splitter 330. The beam splitter 330 transmits the incident light L2 incident thereon via the projection/imaging dual-purpose lens 50 and guides the light to the light receiver 320. Namely, in the third embodiment, the beam splitter 330 reflects the light L1 and emits the light in the emission direction, and transmits the incident light L2 and guides the light to the light receiver 320.

The beam splitter 330 has a light reflecting surface 332 that reflects the light L1 and transmits the incident light L2. The light reflecting surface 332 includes a central part 332a as the aperture part. The central part 332a is arranged on the optical axis C1. The central part 332a is a light-transmission part that transmits the central light flus L20 included in the incident light L2 and traveling in the paraxial region and guides the central light flux L20 to the light receiver 320. The central light flux 120 passing through the central part 332a travels in the −z~axis direction as the light L21 traveling toward the light receiver 320.

The central part 332a guides the central light flux L20 to the light receiver 320 and sets the diameter of the light L21 traveling toward the light receiver 320 through the imaging optical system 302 to be smaller than the diameter of the incident light L2 when entering the imaging optical system 302. Therefore, the peripheral rays L22 included in the incident light L2 and traveling at positions far from the optical axis C1 become unlikely to be incident on the light receiver 320. Accordingly, the aberration of the image formed on the light receiver 320 is reduced, and thus the detection accuracy of the incident light L2 in the light receiver 320 can be increased.

The light reflecting further surface 332 includes a peripheral part 332b arranged on the outer side relative to the central part 332a and reflecting the light L1. The reflectance of the peripheral part 332b is higher than the reflectance of the central part 332a. Accordingly, the peripheral rays L22 included in the incident light L2 and traveling at positions far from the optical axis C1 are reflected by the peripheral part 332b. Namely, the peripheral rays L22 included in the incident light L2 become unlikely to pass through the beam splitter 330, and thus the peripheral rays L22 become unlikely to be incident on the light receiver 320. Accordingly, the aberration of the image formed on the light receiver 320 is reduced, and thus the detection accuracy of the incident light L2 in the light receiver 320 can be increased further.

The central part 332a may be applied with an AR coating, for example. Incidentally, the central part 332a may also be applied with no AR coating. The peripheral part 332b may be applied with a metal vapor deposition coating or a dielectric beam splitter coating, for example. The shape of the central part 332a is a circular shape, for example.

Incidentally, the shape of the central part 332a is not limited to the circular shape but may also be a different shape. Further, a plurality of reflective regions differing from each other in the reflectance may be formed continuously on the light reflecting surface 332 so that the reflectance decreases smoothly as the position moves from the outer edge of the beam splitter 330 toward the optical axis C1. Furthermore, a plurality of reflective regions may be formed discretely on the light reflecting surface 332 that the reflectance decreases stepwise as the position moves from the outer edge of the beam splitter 330 toward the optical axis C1. From the viewpoint of efficiently guiding the incident light L2 traveling in the vicinity of the optical axis C1 to the light receiver 320, it is desirable to employ the configuration in which a plurality of reflective regions differing from each other in the reflectance are formed continuously on the light reflecting surface 332 so that the reflectance decreases smoothly as the position moves toward the optical axis C1.

According to the third embodiment described above, in the headlight device 300, part of the optical axis C1 of the projection optical system 301 coincides with part of the optical axis C2 of the imaging optical system 302 in the emission direction (specifically, in front of the beam splitter 330). Therefore, the process of adjusting the optical axis C1 of the projection optical system 301 and the optical axis C2 of the imaging optical system 302 is unnecessary in the headlight device 300. Accordingly, it becomes easy to make the irradiation range of the light L1 emitted from the headlight device 300 and the incidence range of the incident light L2 incident on the headlight device 300 coincide with each other.

Further, according to the third embodiment, the imaging optical system 302 of the headlight device 300 includes the beam splitter 330 that transmits part of the incident light L2, and the beam splitter 330 includes the central part 332a as the aperture part arranged on the optical axis C1. The central part 332a guides the central light flux L20 included in the incident light L2 to the light receiver 320 and sets the diameter of the light L21 traveling toward the light receiver 320 through the imaging optical system 302 to be smaller than the diameter of the incident light L2 when entering the imaging optical system 302. Therefore, the peripheral rays L22 included in the incident light L2 and traveling at positions far from the optical axis C1 become unlikely to be incident on the light receiver 320. Accordingly, the aberration of the image formed on the light receiver 320 is reduced, and thus the detection accuracy of the incident light L2 in the light receiver 320 can be increased.

(First Modification of Third Embodiment)

Figure 15:
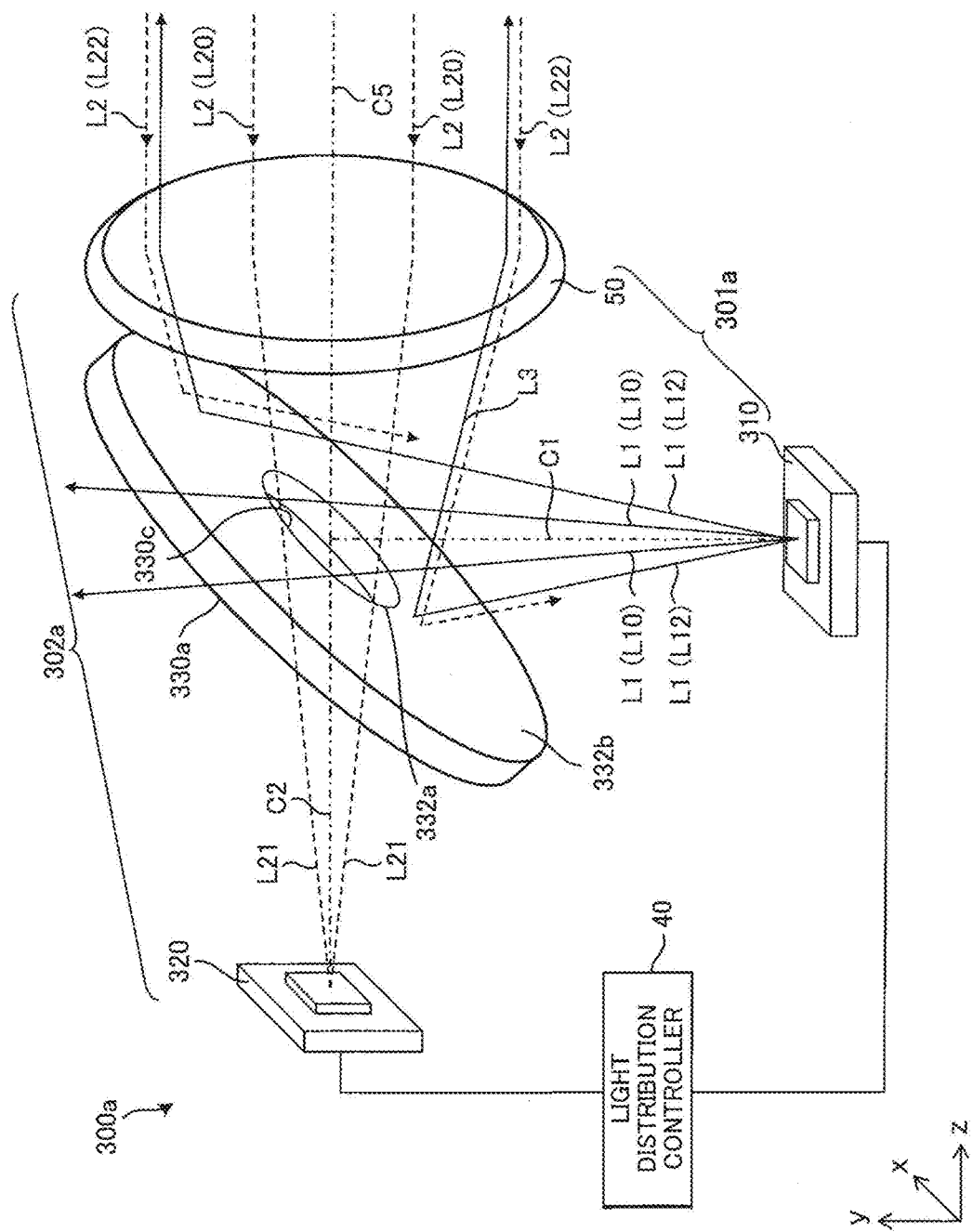
FIG. 15 is a perspective view schematically showing a main configuration of a headlight device according to a first modification of the third embodiment.

In the third embodiment described above, the description has been given of the example in which the aperture part is the light-transmission part of the beam splitter 330 that transmits part of the incident light L2 and guides the light to the light receiver 320. In a first modification of the third embodiment, a description will be given of an example in which the aperture part is an opening 330c formed in a beam splitter 330a. FIG. 15 is a perspective view schematically showing a main configuration of a headlight device 300a according to the first modification of the third embodiment. In FIG. 15, each component identical or corresponding to a component shown in FIG. 14 is assigned the same reference character as in FIG. 14.

As shown in FIG. 15, the headlight device 300a includes the light source part 310, the light receiver 320, the beam splitter 330a and the projection/imaging dual-purpose lens 50. In the first modification of the third embodiment, a projection optical system 301a is formed by the light source part 310, the beam splitter 330a and the projection/imaging dual-purpose lens 50, and an imaging optical system 302a is formed by the projection/imaging dual-purpose lens 50, the beam splitter 330a and the light receiver 320.

The projection optical system 301a and the imaging optical system 302a share the beam splitter 330a and the projection/imaging dual-purpose lens 50, and thus have the common optical axis C5 in front of the beam splitter 330a. Namely, part of the optical axis C1 of the projection optical system 301a coincides with part of the optical axis C2 of the imaging optical system 302a in the emission direction. Accordingly, it becomes easy to make the irradiation range of the light L1 emitted from the headlight device 300a and the incidence range of the incident light L2 incident on the headlight device 300a coincide with each other.

The beam splitter 330a includes the central part 332a as the aperture part. The central part 332a includes the opening 330c that transmits the central light flux L20, which is part of the incident light L2 traveling in the incidence direction, and guides the central light flux 120 to the light receiver 320. The opening 330c sets the diameter of the light L21 traveling toward the light receiver 320 through the imaging optical system 302a (namely, the beam splitter 330a) to be smaller than the diameter of the incident light L2 when entering the imaging optical system 302a (namely, the projection/imaging dual-purpose lens 50). In the light L1 emitted from the light source part 310, a central light flux L10 passes through the opening 330c. In the light L1 emitted from the light source part 310, peripheral rays L12 are reflected by the peripheral part 332b of the beam splitter 330a and are emitted to the +z-axis aide as the light L3.

According to the above described first modification of the third embodiment, in the headlight device 300a, part of the optical axis C1 of the projection optical system 301a coincides with part of the optical axis C2 of the imaging optical system 302a in the emission direction (specifically, in front of the beam splitter 330a). Therefore, the process of adjusting the optical axis C1 of the projection optical system 301a and the optical axis C2 of the imaging optical system 302a is unnecessary in the headlight device 300a. Accordingly, it becomes easy to make the irradiation range of the light L1 emitted from the headlight device 300a and the incidence range of the incident light L2 incident on the headlight device 300a coincide with each other.

Further, according to the first modification of the third embodiment, the imaging optical system 302a of the headlight device 300a includes the beam splitter 330a, and the beam splitter 330a includes the central part 332a as the aperture part arranged on the optical axis C1. The central part 332a includes the opening 330c, and the opening 330c sets the diameter of the light L21 traveling toward the light receiver 320 through the imaging optical system 302a to be smaller than the diameter of the incident light L2 when entering the imaging optical system 302a. Therefore, the peripheral rays L22 included in the incident light L2 and traveling at positions far from the optical axis C1 become unlikely to be incident on the light receiver 320. Accordingly, the aberration of the image formed on the light receiver 320 is reduced, and thus the detection accuracy of the incident light L2 in the light receiver 320 can be increased.

(Second Modification of Third Embodiment)

Figure 16:
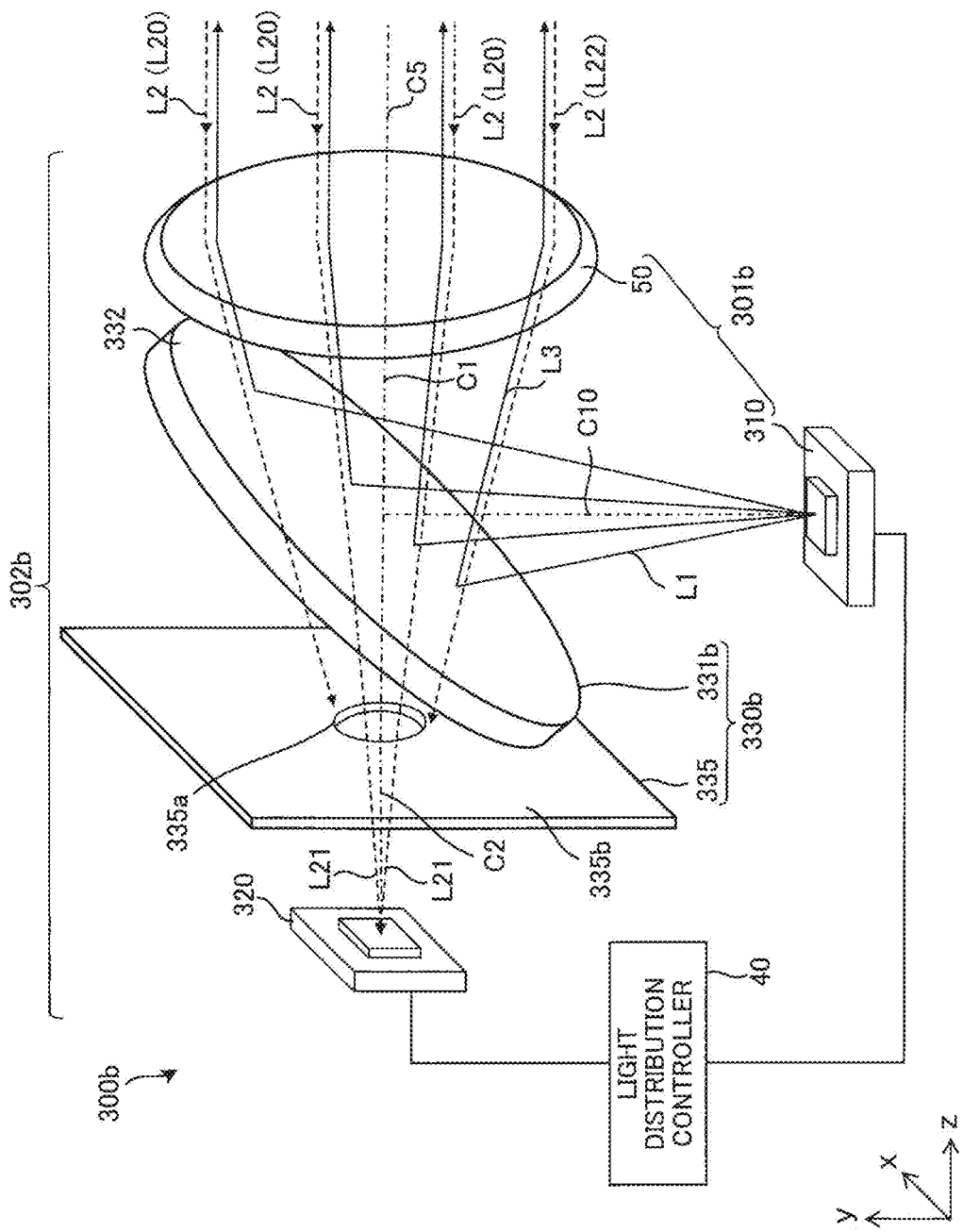
FIG. 16 is a perspective view schematically showing a main configuration of a headlight device according to a second modification of the third embodiment.

In the third embodiment described earlier, the description has been given of the example in which the aperture part is provided in the beam splitter 330. In a second modification of the third embodiment, a description will be given of an example in which the aperture part is a part separate from a beam splitter 331b. FIG. 16 is a perspective view schematically showing a main configuration of a headlight device 300b according to the second modification of the third embodiment. In FIG. 16, each component identical or corresponding to a component shown in FIG. 14 is assigned the same reference character as in FIG. 14.

As shown in FIG. 16, the headlight device 300b includes the light source part 310, the light receiver 320, a first optical part 330b and the projection/imaging dual-purpose lens 50. The first optical part 330b includes the beam splitter 331b and a light blocking plate 335 as the aperture part. In the second modification of the third embodiment, a projection optical system 301b is formed by the light source part 310, the beam splitter 331b and the projection/imaging dual-purpose lens 50. Further, in the second modification of the third embodiment, and imaging optical system 302b is formed by the projection/imaging dual-purpose lens 50, the first optical part 330b (i.e., the beam splitter 331b and the light blocking plate 335) and the light receiver 320.

The projection optical system 301b and the imaging optical system 302b share the beam splitter 331b and the projection/imaging dual-purpose lens 50. Thus, the projection optical system 301b and the imaging optical system 302b have the common optical axis C5 in front of the beam splitter 331b. Namely, part of the optical axis C1 of the projection optical system 301b coincides with part of the optical axis C2 of the imaging optical system 302b in that emission direction.

The beam splitter 331b is arranged on the optical axis C1. The beam splitter 331b has the light reflecting surface 332 that reflects the light L1 and transmits the incident light L2. The beam splitter 331b transmits the incident light L2 and directs the incident light L2 toward the light blocking plate 335.

In the example shown in FIG. 16, the light blocking plate 335 is a light blocking member arranged between the beam splitter 331b and the light receiver 320. The light blocking plate 335 includes an opening 335a arranged on the optical axis C1. A part of the light blocking plate 335 excluding the opening 335a is a light blocking part 335b that blocks the peripheral rays L22 included in the incident light L2 passing through the beam splitter 331b.

The opening 335a is smaller than the diameter of the incident light L2 when entering the imaging optical system 302b. The opening 335a transmits the central light flux L20 as part of the incident light L2 heading for the light receiver 320 from the beam splitter 331b. With this configuration, the opening 335a sets the diameter of the light L21 traveling toward the light receiver 320 through the imaging optical system 302b to be smaller than the diameter of the light L2 when entering the imaging optical system 302b. Therefore, the peripheral rays L22 included in the incident light L2 and traveling at positions far from the optical axis C1 become unlikely to be incident on the light receiver 320. Accordingly, the aberration of the image formed on the light receiver 320 is reduced, and thus the detection accuracy of the incident light L2 in the light receiver 320 can be increased.

According to the above-described second modification of the third embodiment, in the headlight device 300b, part of the optical axis C1 of the projection optical system 301b coincides with part of the optical axis C2 of the imaging optical system 302b in the emission direction (specifically, in front of the beam splitter 331b). Therefore, the process of adjusting the optical axis C1 of the projection optical system 301b and the optical axis C2 of the imaging optical system 302b is unnecessary in the headlight device 300b. Accordingly, it becomes easy to make the irradiation range of the light L1 emitted from the headlight device 300b and the incidence range of the incident light L2 incident on the headlight device 300b coincide with each other.

Further, according to the second modification of the third embodiment, the imaging optical system 302b of the headlight device 300b includes the first optical part 330b, and the first optical part 330b includes the light blocking plate 335 as the aperture part including the opening 335a. The opening 335a is arranged on the optical axis C1 and is smaller than the diameter of the incident light L2 when entering the imaging optical system 302b. With this configuration, the opening 335a sets the diameter of the light L21 traveling toward the light receiver 320 through the imaging optical system 302b to be smaller than the diameter of the incident light L2 when entering the imaging optical system 302b. Therefore, the peripheral rays L22 included in the incident light L2 and traveling at positions far from the optical axis C1 become unlikely to be incident on the light receiver 320. Accordingly, the aberration of the image formed on the light receiver 320 is reduced, and thus the detection accuracy of the incident light L2 in the light receiver 320 can be increased.

Fourth Embodiment

In the first embodiment described earlier, the description has been given of the example in which the light-transmission surface 33 and the light reflecting surface 32 of the beam splitter 31 are parallel to each other. In a fourth embodiment, a description will be given of an example in which a surface of a beam splitter 430 on which the light L1 is incident and a surface of the beam splitter 430 on which the incident light L2 is incident are not parallel to each other. FIG. 17 is a side view schematically showing a main configuration of a headlight device 400 according to the fourth embodiment. In FIG. 17, each component identical or corresponding to a component shown in FIG. 1 is assigned the same reference character as in FIG. 1.

As shown in FIG. 17, the headlight device 400 includes the light source part 10, the light receiver 20, the beam splitter 430 and the projection/imaging dual purpose lens 50. The beam splitter 430 is arranged on the optical axis C1. In the fourth embodiment, a projection optical system 401 is formed by the light source part 10, the beam splitter 430 and the projection/imaging dual-purpose lens 50. Further, an imaging optical system 402 is formed by the projection/imaging dual-purpose lens 50, the beam splitter 430 and the light receiver 20.

The beam splitter 430 has a first surface 432 on which the light L1 emitted from the light source part 10 is incident and a second surface 433 on which the incident light L2 is incident. In the fourth embodiment, the first surface 432 is a light-transmission surface that transmits the light L1 and directs the light toward the projection/imaging dual-purpose lens 50, and the second surface 433 is a light reflecting surface that reflects the incident light L2 and directs the reflected light toward the light receiver 20. Thus, in the example shown in FIG. 17, the projection optical system 401 is an optical path passing through the beam splitter 430, and the imaging optical system 402 is an optical path reflected by the beam splitter 430.

The first surface 432 and the second surface 433 are not parallel to each other. In the example shown in FIG. 17, an angle $\theta_1$ as a first angle formed by the first surface 432 and the optical axis C20 of the light receiver 20 is smaller than an angle $\theta_2$ as a second angle formed by the second surface 433 and the optical axis C20. Thus, the shape of the beam splitter 430 as viewed from the x-axis direction is a wedge shape. Incidentally, each of the angle $\theta_1$ and the angle $\theta_2$ may have tolerance.

Here, in the case where the projection optical system 401 is an optical path passing through the bear splitter 430 and the imaging optical system 402 is an optical path reflected by the beam splitter 430 as shown in FIG. 17, a ghost image of light L25, which is emitted from the second surface 433 after entering the inside of the beam splitter 430 and being reflected by the first surface 432, is incident on the light receiving surface of the light receiver 20 in addition to an image of the light L21 included in the incident light L2 and reflected by the second surface 433. Further, in a case where the projection optical system is an optical path reflected by the beam splitter and the imaging optical system is an optical path passing through the beam splitter differently from FIG. 17, in the light distribution pattern of the light projected in the emission direction, there exists a ghost image of light, which is emitted from the light reflecting surface after entering the inside of the beam splitter through the light reflecting surface and being reflected by the light-transmission surface, in addition to the light distribution pattern of the light reflected by the light reflecting surface of the beam splitter.

In the fourth embodiment, the angle $\theta_1$ formed by the first surface 432 and the optical axis C20 differs from the angle, $\theta_2$ formed by the second surface 433 and the optical axis C20 and the angle $\theta_1$ is smaller than the angle $\theta_2$ as mentioned above. With this configuration, the image formation position of the ghost image of the light L25 at the light receiver 20 can be made to coincide with the image formation position of the image of the light L21. Accordingly, the ghost image is corrected, and thus the detection accuracy of the incident light L2 in the light receiver 20 can be increased further.

Further, also in the case where the projection optical system is an optical path reflected by the beam splitter and the imaging optical system is an optical path passing through the bear splitter, the light distribution pattern and the ghost image be superimposed at a sufficiently far position in the emission direction since the angle $\theta_1$ and the angle $\theta_2$ are different from each other.

According to the fourth embodiment described above, on the beam splitter 430, the first surface 432 on which the light L1 is incident and the second surface 433 on which the incident light L2 is incident are not parallel to each other. Specifically, the angle $\theta_1$ formed by the first surface 432 and the optical axis C20 is smaller than the angle $\theta_2$ formed by the second surface 433 and the optical axis C20. With this configuration, the image formation position of the ghost image of the light 125 at the light receiver can be made to coincide with the image formation position of the image of the light L21. Accordingly, the ghost image is corrected, and thus the detection accuracy of the incident light L2 in the light receiver 20 can be increased further.

DESCRIPTION OF REFERENCE CHARACTERS 10, 310: light source part, 11: light-emitting element, 12: light-emitting surface, 20, 320: light receiver, 21: light receiving element, 22: light receiving surface, 30, 30e, 31, 330, 330a, 331b, 430: beam splitter, 30f, 330b: first optical part, 32, 332: light reflecting surface, 32a, 32e, 332a: central part 32a (aperture part), 32b, 332b: peripheral part, 33, 333: light-transmission surface, 35, 335: light blocking plate (aperture part), 35a, 330c, 335a: opening, 40: light distribution controller, 50: projection/imaging dual-purpose lens, 60: condensing lens, 70: imaging lens, 90: irradiation surface, 100, 100a, 100b, 100c, 100d, 100e, 100f, 300, 300a, 300b, 400: headlight device, 101, 101a, 101b, 101d, 101e, 101f, 301, 301a, 301b, 401: projection optical system, 102, 102a, 102c, 102d, 102e, 302, 302a, 302b, 402: imaging optical system, 432: first surface, 433: second surface, C1, C2, C5, C6, C7, C10, C20: optical axis, L1, L3, L21: light, L2: incident light, L20: central light flux

What is claimed is:

1. A headlight device comprising:
a first optical system that emits first light in a predetermined emission direction, the first optical system having a first optical axis; and
a second optical system on which second light traveling in an incidence direction opposite to the emission direction is incident, the second optical system having a second optical axis, and including a light receiver and a beam splitter,
wherein:
part of the first optical axis coincides with part of the second optical axis in the emission direction,
the beam splitter emits the first light in the emission direction and guides the second light traveling in the incidence direction to the light receiver,
the beam splitter includes a central part, which is arranged on the first optical axis, reflects part of the second light traveling in the incidence direction and guides the part to the light receiver, and
the central part sets a diameter of the second light traveling toward the light receiver through the second optical system to be smaller than a diameter of the second light when entering the second optical system.

2. The headlight device according to claim 1, wherein the beam splitter further includes a peripheral part that is arranged on an outer side relative to the central part, transmits the first light, and reflects the second light, and
wherein reflectance of the peripheral part is lower than reflectance of the central part.

3. The headlight device according to claim 1, wherein the central part is smaller than the diameter of the second light when entering the second optical system.

4. The headlight device according to claim 1, wherein the first optical part is a beam splitter that emits the first light in the emission direction and guides the second light traveling in the incidence direction to the light receiver,
wherein the beam splitter has a first surface on which the first light is incident and a second surface on which the second light is incident, and
wherein the first surface and the second surface are not parallel to each other.

5. The headlight device according to claim 4, wherein a first angle formed by the first surface and an optical axis of the light receiver is smaller than a second angle formed by the second surface and the optical axis of the light receiver.

6. The headlight device according to claim 1, wherein at least one of the first optical system and the second optical system includes a second optical part.

7. The headlight device according to claim 6, wherein the second optical part includes a first optical element that is arranged on an optical path of the first light traveling in the emission direction and is arranged on an optical path of the second light traveling in the incidence direction.

8. The headlight device according to claim 6, wherein the first optical system includes a light source part that emits the first light and the second optical part, and
wherein the second optical part includes a second optical element arranged on an optical path of the first light emitted from the light source part and heading for the central part.

9. The headlight device according to claim 6, wherein the second optical system includes the second optical part, and
wherein the second optical part includes a third optical element arranged on an optical path of the second light heading for the light receiver through the central part.

10. A headlight device comprising:
a first optical system that emits first light in a predetermined emission direction, the first optical system having a first optical axis; and
a second optical system on which second light traveling in an incidence direction opposite to the emission direction is incident, the second optical system having a second optical axis, and including a light receiver and a beam splitter,
wherein:
part of the first optical axis coincides with part of the second optical axis in the emission direction,
the beam splitter emits the first light in the emission direction and guides the second light traveling in the incidence direction to the light receiver,
the beam splitter includes a central part, which is arranged on the first optical axis, the central part reflects the first light and transmits part of the second light traveling in the incidence direction and guides the part to the light receiver,
the central part sets a diameter of the second light traveling toward the light receiver through the second optical system to be smaller than a diameter of the second light when entering the second optical system,
the beam splitter further includes a peripheral part that is arranged on an outer side relative to the central part and reflects the first light, reflectance of the peripheral part is higher than reflectance of the central part.

11. The headlight device according to claim 10, wherein the central part includes a light-transmission part that is arranged on the first optical axis and transmits part of the second light traveling in the incidence direction.

12. The headlight device according to claim 10, wherein the central part includes an opening that is arranged on the first optical axis and transmits part of the second light traveling in the incidence direction.

13. A headlight device comprising:
a first optical system that emits first light in a predetermined emission direction, the first optical system having a first optical axis; and
a second optical system on which second light traveling in an incidence direction opposite to the emission direction is incident, the second optical system having a second optical axis, and including a light receiver and a first optical part with a light reflecting surface that reflects the second light and guides the light to the light receiver,
wherein:
part of the first optical axis coincides with part of the second optical axis in the emission direction,
part of an optical axis of the first optical system coincides with part of an optical axis of the second optical system in the emission direction,
the light reflecting surface includes a central part arranged on the optical axis of the first optical system, an area of the central part is less than or equal to 20% of area of the light reflecting surface and a reflectance higher than 50% and less than or equal to 100%, and the central part sets a diameter of the second light traveling toward the light receiver through the second optical system to be smaller than a diameter of the second light when entering the second optical system.

* * * * *